United States Patent
Li et al.

(10) Patent No.: US 12,267,738 B2
(45) Date of Patent: Apr. 1, 2025

(54) HANDOVER IN INTEGRATED SMALL CELL AND WIFI NETWORKS VIA AN EXTENDED X2 INTERFACE

(71) Applicant: InterDigital Patent Holdings, Inc., Wilmington, DE (US)

(72) Inventors: Qing Li, Princeton Junction, NJ (US); Michael F. Starsinic, Newtown, PA (US); John L. Tomici, Southold, NY (US); Ahmed Mohamed, Miramar, FL (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/119,903

(22) PCT Filed: Feb. 20, 2015

(86) PCT No.: PCT/US2015/016867
§ 371 (c)(1),
(2) Date: Aug. 18, 2016

(87) PCT Pub. No.: WO2015/127241
PCT Pub. Date: Aug. 27, 2015

(65) Prior Publication Data
US 2017/0070923 A1 Mar. 9, 2017

Related U.S. Application Data

(60) Provisional application No. 61/942,900, filed on Feb. 21, 2014, provisional application No. 62/024,287, filed on Jul. 14, 2014.

(51) Int. Cl.
*H04B 17/382* (2015.01)
*H04L 1/1607* (2023.01)
(Continued)

(52) U.S. Cl.
CPC ...... *H04W 36/0066* (2013.01); *H04B 17/382* (2015.01); *H04L 1/1657* (2013.01);
(Continued)

(58) Field of Classification Search
CPC ............. H04W 28/0252; H04W 72/12; H04W 72/231; H04W 36/00; H04W 36/0005;
(Continued)

(56) References Cited

U.S. PATENT DOCUMENTS

| | | | |
|---|---|---|---|
| 8,130,718 | B2 | 3/2012 | Shaheen |
| 9,294,926 | B2 | 3/2016 | Pragada |

(Continued)

FOREIGN PATENT DOCUMENTS

| | | |
|---|---|---|
| CN | 101841880 A | 9/2010 |
| CN | 102547858 A | 7/2012 |

(Continued)

OTHER PUBLICATIONS

3GPP, TS 29.281, V11.6.0, Mar. 2013, pp. 1-27 (Year: 2013).*
(Continued)

*Primary Examiner* — Salvador E Rivas
(74) *Attorney, Agent, or Firm* — Flaster Greenberg P.C.

(57) ABSTRACT

Systems and methods are disclosed for inter-system mobility in integrated LTE and trusted WLAN access networks (TWAN). An X2' interface, adapted for both control plane and user plane communications, exists between an eNB and WLAN access point. A WLAN that has a UE attached thereto that is communicating with an EPC communicates over the X2' interface with an C(H)eNB to handover communications from the WLAN to the (H)eNB. Similarly, an (H)eNB that has a UE attached thereto communicates over the X2' interface with a WLAN to handover communications from the (H)eNB to the WLAN.

20 Claims, 19 Drawing Sheets

(51) Int. Cl.
  *H04W 28/02*  (2009.01)
  *H04W 36/00*  (2009.01)
  *H04W 72/231* (2023.01)
  *H04W 76/11*  (2018.01)
  *H04L 5/00*   (2006.01)
  *H04W 52/02*  (2009.01)
  *H04W 52/14*  (2009.01)
  *H04W 72/12*  (2023.01)
  *H04W 74/00*  (2009.01)
  *H04W 84/02*  (2009.01)
  *H04W 84/04*  (2009.01)
  *H04W 84/12*  (2009.01)
  *H04W 88/06*  (2009.01)
  *H04W 88/08*  (2009.01)
  *H04W 92/20*  (2009.01)

(52) U.S. Cl.
  CPC ... *H04W 28/0252* (2013.01); *H04W 36/0005* (2013.01); *H04W 72/231* (2023.01); *H04W 76/11* (2018.02); *H04L 5/0053* (2013.01); *H04W 52/0203* (2013.01); *H04W 52/14* (2013.01); *H04W 72/12* (2013.01); *H04W 74/004* (2013.01); *H04W 74/006* (2013.01); *H04W 84/02* (2013.01); *H04W 84/042* (2013.01); *H04W 84/12* (2013.01); *H04W 88/06* (2013.01); *H04W 88/08* (2013.01); *H04W 92/20* (2013.01)

(58) Field of Classification Search
  CPC . H04W 36/16; H04W 36/0055; H04W 36/34; H04W 36/36; H04W 36/24; H04W 36/0066; H04W 76/11; H04W 92/20; H04W 84/042; H04W 88/06; H04W 88/08; H04W 84/12; H04W 36/14; H04W 84/02; H04W 52/14; H04W 74/004; H04W 74/006; H04B 17/382; H04L 1/1657; H04L 5/0053
  See application file for complete search history.

(56) References Cited

U.S. PATENT DOCUMENTS

| | | | |
|---|---|---|---|
| 2001/0043579 A1* | 11/2001 | Tourunen | H04L 12/08 370/331 |
| 2005/0254469 A1* | 11/2005 | Verma | H04W 36/0022 370/338 |
| 2006/0126565 A1 | 6/2006 | Shaheen | |
| 2006/0211447 A1* | 9/2006 | Purkayastha | H04W 36/0066 455/552.1 |
| 2008/0259870 A1 | 10/2008 | Olvera-Hernandez et al. | |
| 2009/0233600 A1* | 9/2009 | Johansson | H04W 36/14 455/435.2 |
| 2009/0275334 A1* | 11/2009 | Xie | H04W 36/04 455/436 |
| 2011/0075633 A1* | 3/2011 | Johansson | H04W 36/02 370/328 |
| 2011/0086635 A1* | 4/2011 | Grob-Lipski | H04W 36/32 455/423 |
| 2012/0077510 A1 | 3/2012 | Chen et al. | |
| 2012/0270552 A1* | 10/2012 | Shi | H04W 36/0061 455/438 |
| 2013/0039185 A1* | 2/2013 | Teyeb | H04B 7/155 370/235 |
| 2013/0045740 A1* | 2/2013 | Gayde | H04W 48/06 455/436 |
| 2013/0072201 A1* | 3/2013 | Nakamura | H04W 16/08 455/445 |
| 2013/0084867 A1 | 4/2013 | Sirotkin | |
| 2013/0088983 A1* | 4/2013 | Pragada | H04W 24/10 370/252 |
| 2013/0115955 A1* | 5/2013 | Deng | H04W 48/16 455/437 |
| 2013/0201904 A1* | 8/2013 | Toskala | H04W 36/08 370/315 |
| 2013/0272132 A1* | 10/2013 | Heo | H04W 28/02 370/236.2 |
| 2013/0281082 A1* | 10/2013 | Drazynski | H04W 24/02 455/422.1 |
| 2013/0286851 A1* | 10/2013 | Moser | H04W 88/10 370/241.1 |
| 2013/0301423 A1* | 11/2013 | Sirotkin | H04W 4/90 370/241.1 |
| 2014/0056243 A1* | 2/2014 | Pelletier | H04L 5/0032 370/329 |
| 2014/0073329 A1* | 3/2014 | Kang | H04W 36/12 455/439 |
| 2014/0155065 A1* | 6/2014 | Centonza | H04W 36/0066 455/436 |
| 2014/0286159 A1* | 9/2014 | Etemad | H04W 36/14 370/230 |
| 2014/0376515 A1* | 12/2014 | Lei | H04W 36/08 370/331 |
| 2015/0063222 A1* | 3/2015 | Wang | H04W 72/54 370/329 |
| 2015/0078344 A1* | 3/2015 | Futaki | H04W 36/00833 370/332 |
| 2015/0078360 A1* | 3/2015 | Wang | H04W 88/08 370/338 |
| 2015/0092688 A1* | 4/2015 | Jeong | H04W 76/11 370/329 |
| 2015/0131552 A1* | 5/2015 | He | H04W 76/12 370/329 |
| 2015/0223284 A1* | 8/2015 | Jain | H04W 72/02 370/329 |
| 2015/0304921 A1* | 10/2015 | Hong | H04W 24/10 455/436 |
| 2015/0319666 A1* | 11/2015 | Kang | H04W 36/0005 370/332 |
| 2015/0334635 A1* | 11/2015 | Caretti | H04W 48/10 370/335 |
| 2015/0358876 A1* | 12/2015 | Liang | H04W 36/14 370/331 |
| 2016/0119861 A1* | 4/2016 | Jin | H04W 48/16 370/338 |
| 2016/0150452 A1* | 5/2016 | Kitaji | H04W 36/08 370/315 |
| 2017/0257876 A1 | 9/2017 | Loehr et al. | |
| 2018/0279147 A1* | 9/2018 | Kazmi | H04W 24/10 |
| 2019/0268918 A1 | 8/2019 | Baghel et al. | |
| 2019/0342895 A1 | 11/2019 | Loehr et al. | |
| 2021/0022091 A1 | 1/2021 | Li et al. | |
| 2021/0410084 A1 | 12/2021 | Li et al. | |

FOREIGN PATENT DOCUMENTS

| | | |
|---|---|---|
| CN | 103380635 A | 10/2013 |
| EP | 2026618 A1 | 2/2009 |
| EP | 2416605 A1 | 2/2012 |
| EP | 3206452 A1 | 8/2017 |
| JP | 2010-521878 A | 6/2010 |
| KR | 10-2013-0008157 A | 1/2013 |
| WO | 2010/105677 A1 | 9/2010 |
| WO | 2011/057056 A1 | 5/2011 |
| WO | 2012/044372 A1 | 4/2012 |
| WO | WO 2013-009147 | 1/2013 |
| WO | WO 2013-120274 A1 | 8/2013 |
| WO | WO 2015-057343 A1 | 4/2015 |
| WO | 2015/109204 A1 | 7/2015 |
| WO | 2016/025163 A1 | 2/2016 |
| WO | 2018/075828 A1 | 4/2018 |

OTHER PUBLICATIONS

3GPP, TS 36.423 , V11.7.0, Dec. 2013, pp. 1-144 (Year: 2013).*
3GPP, TS 36.331 , V11.6.0, Dec. 2013, pp. 1-349 (Year: 2013).*

(56) References Cited

OTHER PUBLICATIONS

Japanese Patent Application No. 2016-553401: Reasons of Rejection dated Aug. 29, 2017, 5 pages.
3rd Generation Partnership Project; (3GPP) TR 23.852 V12.0.0, 3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12), Sep. 2013, 157 pages.
3rd Generation Partnership Project; (3GPP) TS 22.234 V11.0.0, 3rd Generation Partnership Project; Technical Specification Group Services and System Aspects; Requirements on 3GPP system to Wireless Local Area Network (WLAN) interworking (Release 11), Sep. 2012, 15 pages.
3rd Generation Partnership Project; (3GPP) TS 23.234 V11.0.0, 3rd Generation Partnership Project; Technical Specification Group Services and System Aspects; 3GPP system to Wireless Local Area Network (WLAN) interworking; System description (Release 11), Sep. 2012, 84 pages.
3rd Generation Partnership Project; (3GPP) TS 23.402 V12.5.0, 3rd Generation Partnership Project; Technical Specification Group Services and System Aspects; Architecture Enhancements for Non-3GPP Accesses (Release 12), Jun. 2014, 291 pages.
3rd Generation Partnership Project; (3GPP) TS 29.273 V12.4.0, 3rd Generation Partnership Project; Technical Specification Group Core Network and Terminals; Evolved Packet System (EPS); 3GPP EPS AAA interfaces (Release 12), Jun. 2014, 153 pages.
3rd Generation Partnership Project; (3GPP) TS 29.274 V12.5.0, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12), Jun. 2014, 310 pages.
3rd Generation Partnership Project; (3GPP) TS 29.281 V11.6.0 3rd Generation Partnership Project; Technical Specification Group Core Network and Terminals; General Packet Radio System (GPRS) Tunnelling Protocol User Plane (GTPv1-U) (Release 11), Mar. 2013, 27 pages.
3rd Generation Partnership Project; (3GPP) TS 33.402 V12.3.0, 3rd Generation Partnership Project; Technical Specification Group Services and System Aspects; 3GPP System Architecture Evolution (SAE); Security aspects of non-3GPP accesses (Release 12), Mar. 2014, 55 pages.
3rd Generation Partnership Project; (3GPP) TS 36.300 V11.10.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2014, 210 pages.
3rd Generation Partnership Project; (3GPP) TS 36.322 V12.0.0, 3rd Generation Partnership Project; Technical Specification Group Radio Access Network; Evolved Universal Terrestrial Radio Access (E-UTRA); Radio Link Control (RLC) protocol specification (Release 12), Jun. 2014, 40 pages.
3rd Generation Partnership Project; (3GPP) TS 36.323 V12.0.0, 3rd Generation Partnership Project; Technical Specification Group Radio Access Network; Evolved Universal Terrestrial Radio Access (E-UTRA); Packet Data Convergence Protocol (PDCP) specification (Release 12), Jun. 2014, 28 pages.
3rd Generation Partnership Project; (3GPP) TS 36.401 V11.2.0, 3rd Generation Partnership Project; Technical Specification Group Radio Access Network; Evolved Universal Terrestrial Radio Access Network (E-UTRAN); Architecture description (Release 11) Sep. 2013, 20 pages.
3rd Generation Partnership Project; (3GPP), TS 36.331 V12.2.0, 3rd Generation Partnership Project; Technical Specification Group Radio Access Network; Evolved Universal Terrestrial Radio Access (E-UTRA); Radio Resource Control (RRC); Protocol specification (Release 12) Jun. 2014, 365 pages.
3rd Generation Partnership Project; (3GPP), TS 36.420 V12.0.0, 3rd Generation Partnership Project; Technical Specification Group Radio Access Network; Evolved Universal Terrestrial Radio Access Network (E-UTRAN); X2 general aspects and principles (Release 12) Jun. 2014, 12 pages.
3rd Generation Partnership Project; (3GPP), TS 36.422 V11.0.0, 3rd Generation Partnership Project; Technical Specification Group Radio Access Network; Evolved Universal Terrestrial Radio Access Network (E-UTRAN); X2 signalling transport (Release 11), Sep. 2012, 8 pages.
3rd Generation Partnership Project; (3GPP), TS 36.423 V12.2.0, 3rd Generation Partnership Project; Technical Specification Group Radio Access Network; Evolved Universal Terrestrial Radio Access Network (E-UTRAN); X2 application protocol (X2AP) (Release 12) Jun. 2014, 151 pages.
3rd Generation Partnership Project; (3GPP), TS 36.424 V12.0.0, 3rd Generation Partnership Project; Technical Specification Group Radio Access Network; Evolved Universal Terrestrial Radio Access Network (E-UTRAN); X2 data transport (Release 12) Mar. 2014, 8 pages.
Braden, R., "Requirements for Internet Hosts—Communication Layers", Internet Engineering Task Force (IETF), RFC 1122, Oct. 1989, 116 pages.
Deering, S. and Hinden, R., "Internet Protocol, Version 6 (Ipv6) Specification draft-ietf-6man-rfc2460bis-08", Network Working Group, Internet draft, Nov. 15, 2016, 39 pages.
IEEE "Part 11: Wireless LAN Medium Access Control (MAC) and Physical Layer (PHY) Specifications", 802.11, IEEE Standard for Information technology—Telecommunications and information exchange between systems Local and metropolitan area networks—Specific requirements, IEEE Computer Society, IEEE Std 802.11™—2012.
International Application No. PCT/US2015/016867: International Search Report and Written Opinion dated Jun. 1, 2015, 14 pages.
Internet Engineering Task Force (IETF), "Transmission Control Protocol Darpa Internet Program Protocol Specification", RFC 793, Sep. 1981, 91 pages.
Internet Engineering Task Force (IETF), Internet Protocol Darpa Internet Program Protocol Specification, RFC 791, Sep. 1981, 51 pages.
Nichols et al., "Definition of the Differentiated Services Field (DS Field) in the IPv4 and IPv6 Headers", Network Working Group, RFC 2474, Dec. 1998, 20 pages.
Postel, J., "User Datagram Protocol", RFC 768, Aug. 28, 1980, 3 pages.
Stewart, R., "Stream Control Transmission Protocol", Network Working Group, RFC 4960, Sep. 2007, 152 pages.
3$^{rd}$ Generation Partnership Project; (3GPP) TS36.401 V10.1.0, 3rd Generation Partnership Project; Technical Specification Group Radio Access Network; Evolved Universal Terrestrial Radio Access Network (E-UTRAN); Architecture description (Release 10), Mar. 2011, 20 pages.
Korean Patent Application No. 10-2016-7025843: Notice of Preliminary Rejection dated Jul. 17, 2017, 5 pages.
ETSI, "LTE; Evolved Universal Terrestrial Radio Access Network (E-UTRAN); X2 Application Protocol (X2AP)", 3G PP TS 36.423 version 11.7.0 Release 11, Technical Specification, Jan. 2014, 145 pages.

\* cited by examiner

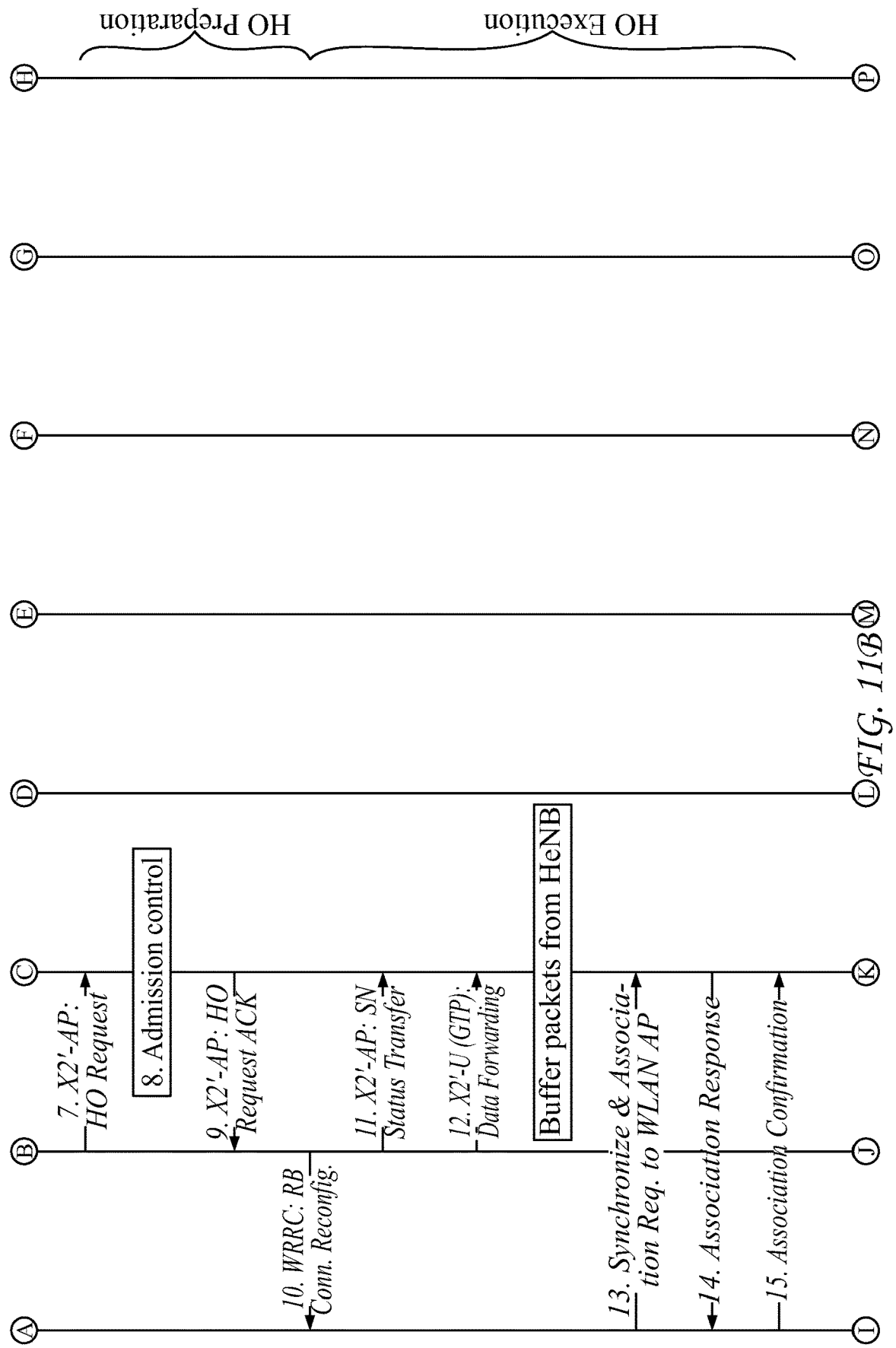

HANDOVER IN INTEGRATED SMALL CELL AND WIFI NETWORKS VIA AN EXTENDED X2 INTERFACE

CROSS REFERENCE TO RELATED APPLICATIONS

This application is a National Stage Application filed under 35 U.S.C. 371 of International Application No. PCT/US2015/016867, filed Feb. 20, 2015, which claims benefit under 37 U.S.C. § 119(e) of Provisional U.S. Patent Application No. 61/942,900, filed on Feb. 21, 2014, and Provisional U.S. Patent Application No. 62/024,287, filed on Jul. 14, 2014, the contents of both of which are hereby incorporated herein by in their entireties.

BACKGROUND

As wireless communications technologies have evolved, additional demands have been placed on wireless systems to support more extensive use of diverse wireless networks. For example, mobile network operators (MNOs) have begun incorporating "carrier-grade" WiFi in ways that complement their cellular and core network services. MNOs have sought to employ WiFi to offload Internet traffic from their cellular networks. MNOs have also sought to provide users of WiFi networks with access to the evolved packet core (EPC) of cellular systems.

While demand continues to increase for inter-system integration of cellular and WiFi networks, existing methods of providing such integration have proven to be resource intensive and too often result in interruptions in ongoing communications.

SUMMARY

Applicants disclose herein systems and methods for inter-system handovers between integrated long term evolution (LTE) wireless access networks and trusted wireless local area network (WLAN) access networks (TWAN). A communication interface, referred to as the X2' interface, is defined between the LTE wireless access network and the TWAN. The X2' interface is adapted to communicate both control plane signaling and user plane data between the LTE access network and the TWAN. An existing communication connection between a user equipment (UE) and the EPC may be handed over from one of the LTE access network and the TWAN to the other by way of communications over the X2' interface between the two networks.

In an example scenario, a UE such as, for example, a wireless phone or other computing device, may have an established communication path to the EPC via a WiFi connection to a WLAN access point (AP). The WLAN is adapted to communicate to the UE configuration information for evaluating the signals that are received by the UE from the WLAN AP and other access nodes in the area. The UE detects and measures signals that are received from access nodes. In an example scenario, the UE detects and measures signals received from a home evolved node B ((H)eNB) associated with a cellular access network as well as signals received from the WLAN AP to which the UE is currently connected. The strengths of the signals received at the UE may indicate that the UE has a better signal through an access point other than the WLAN AP to which the UE is currently attached. The UE determines based upon the received strength data whether or not to request handover to an access point that has a stronger signal. In an example scenario where the information received from the UE may indicate that the UE has a stronger signal for communication with an (H)eNB, the UE may determine to perform a handover to the particular (H)eNB. In such a situation, the UE transmits a handover request to the WLAN.

In response to the request, the WLAN generates and transmits a request to perform a handover to the identified (H)eNB. The handover request is communicated via the X2' interface between the WLAN and the (H)eNB. In an example embodiment, the X2' interface may be implemented between the WLAN to which the UE is attached and the (H)eNB. The (H)eNB receives the handover request via the X2' interface and performs an admission control based upon the particular UE to determine whether or not to implement the handover. In the instance that the (H)eNB determines to implement the handover, the (H)eNB transmits and the WLAN receives via the X2' interface an acknowledgement of the request to perform the handover.

In response to receiving the acknowledgement, the WLAN communicates information to the UE that the UE may use to communicate with the (H)eNB. The WLAN begins transmitting via the X2' interface, and the (H)eNB begins receiving via the X2' interface user data from the UE. The UE synchronizes with the (H)eNB and the (H)eNB establishes its connection through to the EPC. When the connection between the (H)eNB and the EPC has been established, the (H)eNB communicates via the X2' interface an instruction to the WLAN to release its resources associated with its connection to the UE.

In another example scenario, a UE may have an established communication path to the EPC via a connection with an (H)eNB. The (H)eNB is adapted to communicate to the UE configuration information that the UE may use in gathering information relating to the signals that are received by the UE from the (H)eNB and other access nodes in the area. In an example scenario, the UE detects and measures signals received from a WLAN AP as well as the signal received from (H)eNB to which the UE currently has a connection. The UE forwards information reporting on the signal strength to the (H)eNB.

The (H)eNB also performs a measurement of the processing load on the particular (H)eNB. Based upon the evaluation of its processing load, along with the information reporting on the signal strengths received from the (H)eNB and WLAN AP, the (H)eNB determines to generate and transmit via the X2' interface a request to the WLAN for information regarding the processing load on the WLAN. In response to the request, the WLAN generates and transmits via the X2' interface a response containing information specifying the processing load associated with the WLAN.

Using the processing load information received from the WLAN, the signal strength information receive from the UE, and its own load information, the (H)eNB determines to perform a handover. The (H)eNB generates and transmits via the X2' interface a request to perform a handover. The WLAN receives the handover request via the X2' interface and performs an admission control based upon the particular UE and determines whether or not to implement the handover. In the instance that the WLAN determines to implement the handover, the WLAN generates and transmits, and the (H)eNB receives via the X2' interface, an acknowledgement of the request to perform the handover.

In response to receiving the acknowledgement, the (H)eNB communicates information to the UE that the UE may use to communicate with the WLAN AP. The (H)eNB begins transmitting via the X2' interface, and the WLAN begins receiving via the X2' interface, user data from the UE.

The UE synchronizes with the WLAN AP and the WLAN establishes its connection through to the EPC. When the connection between the WLAN and the EPC has been established, the WLAN communicates via the X2' interface an instruction to the (H)eNB to release its resources associated with the connection to the UE.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

FIGS. 11A-C depict a flow diagram illustrating (H)eNB initiated handover from (H)eNB to WLAN via the extended X2 interface in accordance with an example embodiment.

DETAILED DESCRIPTION OF ILLUSTRATIVE EMBODIMENTS

Figure 1:
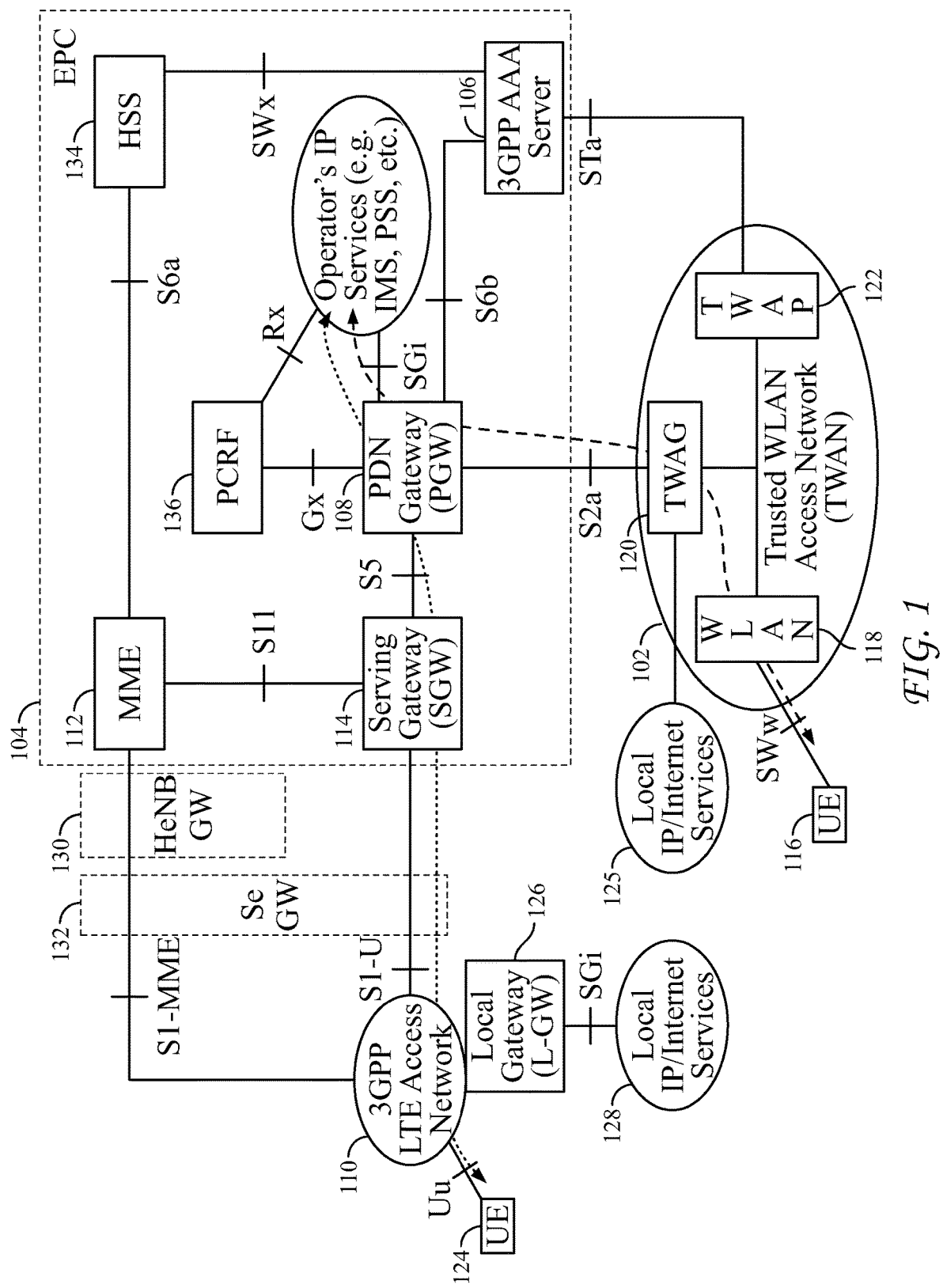
FIG. 1 is a system diagram illustrating a non-roaming architecture for trusted wireless local area network (WLAN) and 3GPP long term evolution (LTE) access to evolved packet core (EPC).

Applicants disclose herein systems and methods for inter-system mobility in integrated LTE and trusted WLAN access networks (TWAN). An X2' interface, adapted for both control plane and user plane communications, exists between an evolved node B (eNB) and WLAN, which may comprise one or more WLAN APs. A WLAN that has a UE attached thereto communicates over the X2' interface with an eNB, which may be, for example a (H)eNB, to handover communications from the WLAN to the eNB. Similarly, an eNB that has a UE attached thereto that is communicating with a packet data network communicates over the X2' interface with a WLAN to handover communications from the eNB to the WLAN.

Example Mobile Network Operations

Under current practices, mobile network operators (MNOs) typically employ WiFi (Wireless Fidelity) for off-loading "best effort" Internet traffic from their cellular and core networks. However, increased interest in operator deployment of "small cells," i.e., localized geographic areas providing wireless network access via 3rd Generation Partnership Project (3GPP), and "carrier WiFi" has encouraged MNOs to seek better inter-operability across local cellular and WiFi networks enabling more control over their subscribers' quality of experience (DoE). Indeed, such integrated access networks are often referred to as Integrated Small Cell and WiFi Networks (ISWN).

As operators adopt "carrier WiFi" to optimize their networks and reduce expenses, it is expected that there will be a greater deployment of "Trusted" WLAN Access Networks (TWAN) that can interface directly with an operator's Mobile Core Network (MCN). Similarly, it is expected that there will be greater integration of Mobile Network Operation (MNO) deployed small cell and WiFi access networks within common geographical areas such as high-traffic urban metropolitan hotspot locations. Such integration is motivated by the growing number of smartphones that support both cellular and WiFi access.

Cellular LTE and TWAN Access to EPC

The 3rd Generation Partnership Project (3GPP) unites a number of telecommunications standard development organizations and provides their members with an environment in which to develop specifications for cellular telecommunications network technologies, including radio access, the core transport network, and service capabilities. 3GPP specifications also provide hooks for non-radio access to the core network, and for interworking with other networks.

The latest evolution of the 3GPP core network architecture for wireless communications is referred to as the Evolved Packet Core (EPC). EPC was first introduced by 3GPP in Release 8 of the standard. It was designed to have a "flat architecture" in order to handle data traffic efficiently from a performance and cost perspective, and few network nodes are involved in the handling of traffic. Protocol conversion is also generally avoided. It was also decided to separate the user data (also known as the "user plane") from the signaling (also known as the "control plane"), which enables network operators to dimension and adapt their networks easily.

FIG. 1 depicts a 3GPP architecture that provides for non-roaming Trusted Wireless Local Area Network (TWAN) and 3GPP LTE access to Evolved Packet Core (EPC) 104. As described in section 16.1.1 of 3GPP Technical Specification (TS) 23.402, "3GPP System Architecture Evolution: Architecture Enhancements for non-3GPP accesses," the contents of which are hereby incorporated herein by reference, when a Wireless Local Area Network (WLAN) 118 is considered trusted by the operator, the Trusted WLAN Access Network 102 can be connected to the Evolved Packet Core 104 via the STa interface toward the 3GPP Authentication, Authorization, and Accounting (AAA) Server/Proxy 106, and via the S2a interface toward the Packet Data Network Gateway (PGW) 108 for user plane traffic flows. It will be appreciated that communication paths exist between the various components of the TWAN 102 and components of the EPC 104. For example, signal paths may exist between UE 116 and WLAN 118 (via, for example, a WLAN access point), between WLAN 118 and Trusted WLAN Access Gateway 120, between the Trusted WLAN Access Gateway 120 and the Packet Data Network Gateway 108, between the WLAN 118 and the Trusted WLAN AAA Proxy (TWAP)122, between the Trusted WLAN AAA Proxy 122 and the 3GPP AAA Server 106, and between the Local IP/Internet Services 125 and the Trusted WLAN Access Gateway 120. Using these communication paths, and as illustrated by the dashed line in FIG. 1, UE 116 may form a communication path through TWAN 102 to PGW 108 in order to access services offered by EPC 104.

The 3GPP LTE access network 110, which may comprise, for example, a radio access base station or node such as an evolved Node B (eNB), is connected to the Evolved Packet Core 104 via the S1-MME interface which provides a communication path with Mobility Management Entity 112. The S1-U interface provides a communication path with Serving Gateway 114, which interfaces with the Packet Data Network Gateway 108 via the S5 interface. It will be appreciated that communication paths exist between the various components of the LTE network 110 and components of the EPC 104. For example, signal paths may exist between the user equipment 124 and the 3GPP LTE Access Network 110, between the 3GPP LTE Access Network 110 and the Mobility Management Entity 112, between the 3GPP LTE Access Network 110 and the Serving Gateway 114, and between the Serving Gateway 114 and the Packet Data Network Gateway 108. Using these communication paths, and as illustrated by the dotted line in FIG. 1, UE 124 may form a communication path through 3GPP LTE access network 110 to PGW 108 in order to access services available at EPC 104.

Still referring to FIG. 1, an optional "Local Gateway" function (L-GW) 126 provides small cell LTE access which may be used, for example, in Home eNB ((H)eNB) deployments. Local IP/Internet Services 128 interfaces with L-GW 126. An optional (H)eNB Gateway 130 may be used to concentrate the control plane signaling for multiple (H)eNBs toward the Mobility Management Entity 112 and may also be used to handle (H)eNB user plane traffic toward the Serving Gateway 114. An optional Security Gateway 132 may be used to provide secure access from the 3GPP LTE access network 110 (e.g., via (H)eNBs) to the Evolved Packet Core 104, i. e., via internet protocol security (IPSec) tunneling.

The Home Subscriber Server (HSS) 134 comprises a database comprising user-related and subscriber-related information. HSS 134 supports functions in mobility management, call and session setup, user authentication and access authorization.

Serving GW (SGW) 114 and PDN GW (PGW) 108 provide user plane access. For example, SGW 114 and PGW 108 may be used to transport IP data traffic between UE 124 and external networks accessed via the EPC 104. SGW 114 operates as a point of interconnect between the radio-side, for example 3GPP LTE Access Network 110, and the EPC 104. SGW 114 serves the UE 124 by routing incoming and outgoing IP packets. It is the anchor point for intra-LTE mobility (e.g., in the case of a handover between eNodeBs) and between LTE and other 3GPP accesses. SGW 114 is logically connected to the other gateway, PDN GW 108.

PDN GW 108 operates as a point of interconnect between the EPC 104 and external IP networks, such as the Internet, which may be referred to as packet data networks (PDN). (Packet Data Network). The PDN GW 108 routes packets to and from the PDNs. The PDN GW 108 also performs various functions such as, for example, IP address/IP prefix allocation and policy control and charging. The 3GPP standard refers to separate SGWs and PGWs, but in practice they may be combined in a single "box" by network vendors.

Mobility Management Entity (MME) 112 provides control plane functionality. For example, MME 112 may handle signaling related to mobility and security for E-UTRAN (Evolved Universal Terrestrial Radio Access Network) access. MME 112 may also be responsible for the tracking and the paging of UEs in idle-mode. In some embodiments, MME 112 operates as the termination point of the Non-Access Stratum (NAS).

Policy and Charging Rules Function (PCRF) 136 determines policy rules in real-time for EPC 104. The PCRF 136 accesses subscriber databases and other specialized functions, such as a charging system, in a centralized manner.

X2 Interface

Figure 2:
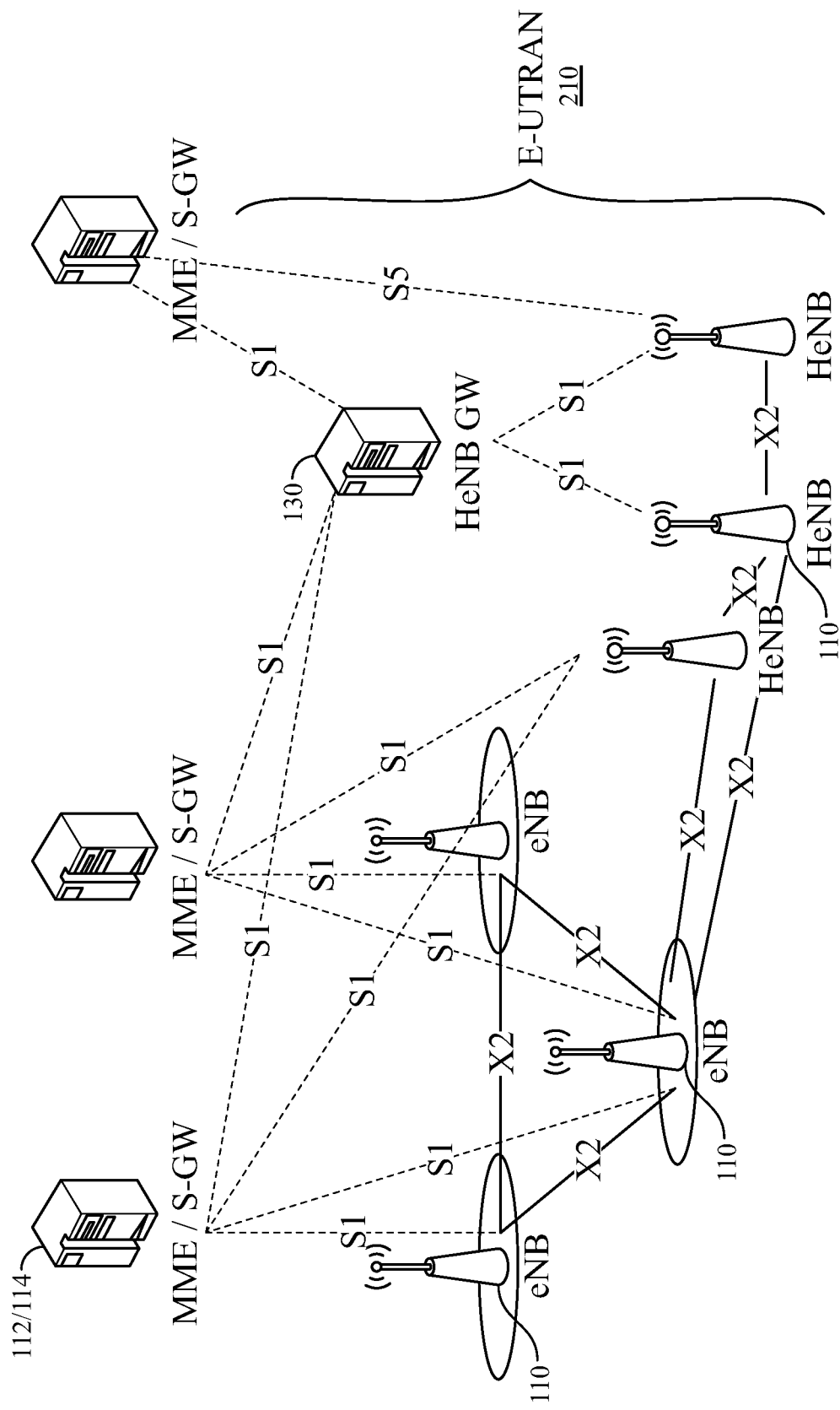
FIG. 2 is a system diagram illustrating overall evolved UMTS terrestrial radio access network (E-UTRAN) architecture with deployed Home eNode B Gateway ((H)eNB GW).

FIG. 2 depicts a high level view of components of an E-UTRA (Evolved Universal Terrestrial Radio Access) network 210, described in 3GPP TS 36.300, the contents of which are hereby incorporated herein by reference, interfacing with components of an EPC 104. As shown, E-UTRA network 210 may comprise a plurality of cellular network access nodes 110, which may be radio access base stations or nodes, and may be referred to as eNBs 110. In the embodiment depicted in FIG. 2, some of the eNBs 110 may be devoted to network access in a home environment and may be referred to as home eNBs or (H)eNBs. As shown, and consistent with the discussion in connection with FIG. 1, the eNBs 110 may communicate with MMEs/SGWs 112/114 comprised in EPC 104 via S1 interfaces. In the example embodiment of FIG. 2, eNBs 110 may communicate via an S1 interface with (H)eNB GW 130, which may communicate via an S1 interface with MMEs/SGWs 112/114.

As depicted in FIG. 2, eNBs 110 may communicate directly with each other using the X2 interface, which is described in 3GPP TS 36.420, the contents of which are hereby incorporated herein by reference. The X2 interface supports a number of functions which may be employed by eNBs. For example, the X2 interface provides functionality that allows for a connection provided to a UE to be handed over from one eNB to another eNB. In other words, the X2 interface provides intra-LTE access system mobility support for ECM-connected UEs. In the handover scenario, the X2 interface may be used, for example, for the following: to perform context transfer from a source eNB to a target eNB; to control user plane transport bearers between the source eNB and the target eNB; to cancel a handover operation; and to perform a UE context release by the source eNB. Additionally, the X2 interface supports the following: performing load management between eNBs; performing inter-cell interference coordination; performing general X2 management and error handling functions; performing application level data exchange between eNBs; performing trace functions; and performing data exchange for self-optimization. Notably, the existing X2 interface does not support direct communications between an eNB and a WLAN.

Figure 3:
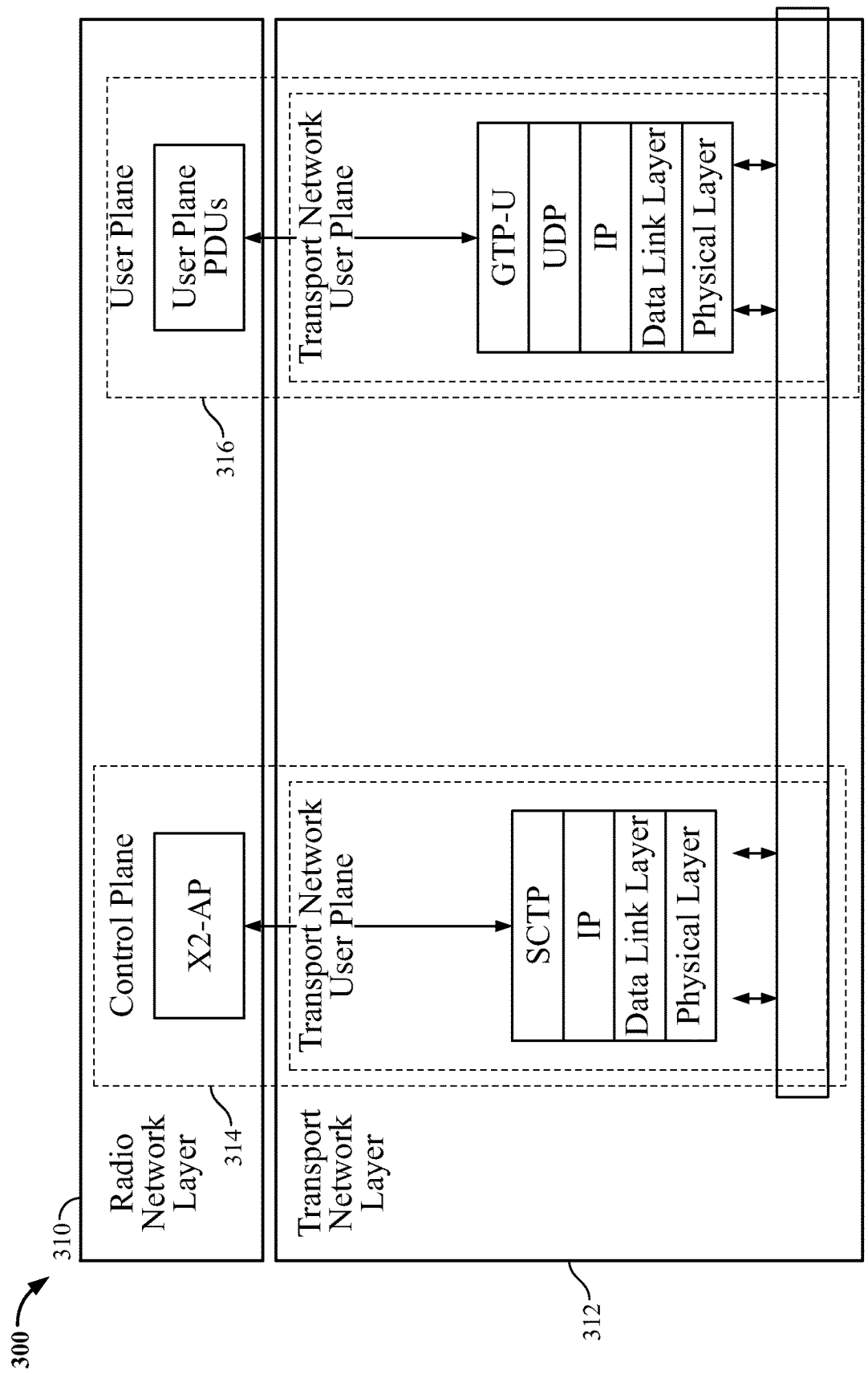
FIG. 3 is a block diagram illustrating an X2 interface protocol stack.

FIG. 3 depicts an example protocol architecture for the existing X2 interface. As shown, the X2 interface protocol architecture comprises two functional layers, a radio network layer (RNL) 310 and a transport network layer (TNL) 312. RNL 310 is adapted to define procedures relating to the interaction between eNBs via the radio network. TNL 312 provides services for user plane and signaling transport. As shown in FIG. 3, a portion of the RNL 310 cooperates with a portion of the TNL 312 to handle control plane 314 signaling. Similarly, a portion of the RNL 310 cooperates with a portion of the TNL 312 to handle user plane 316 signaling. The protocol stack for the existing X2 interface illustrates that direct communication between eNBs and WLANs is not supported.

IEEE 802.11 Layers and Management Entities

Figure 4:
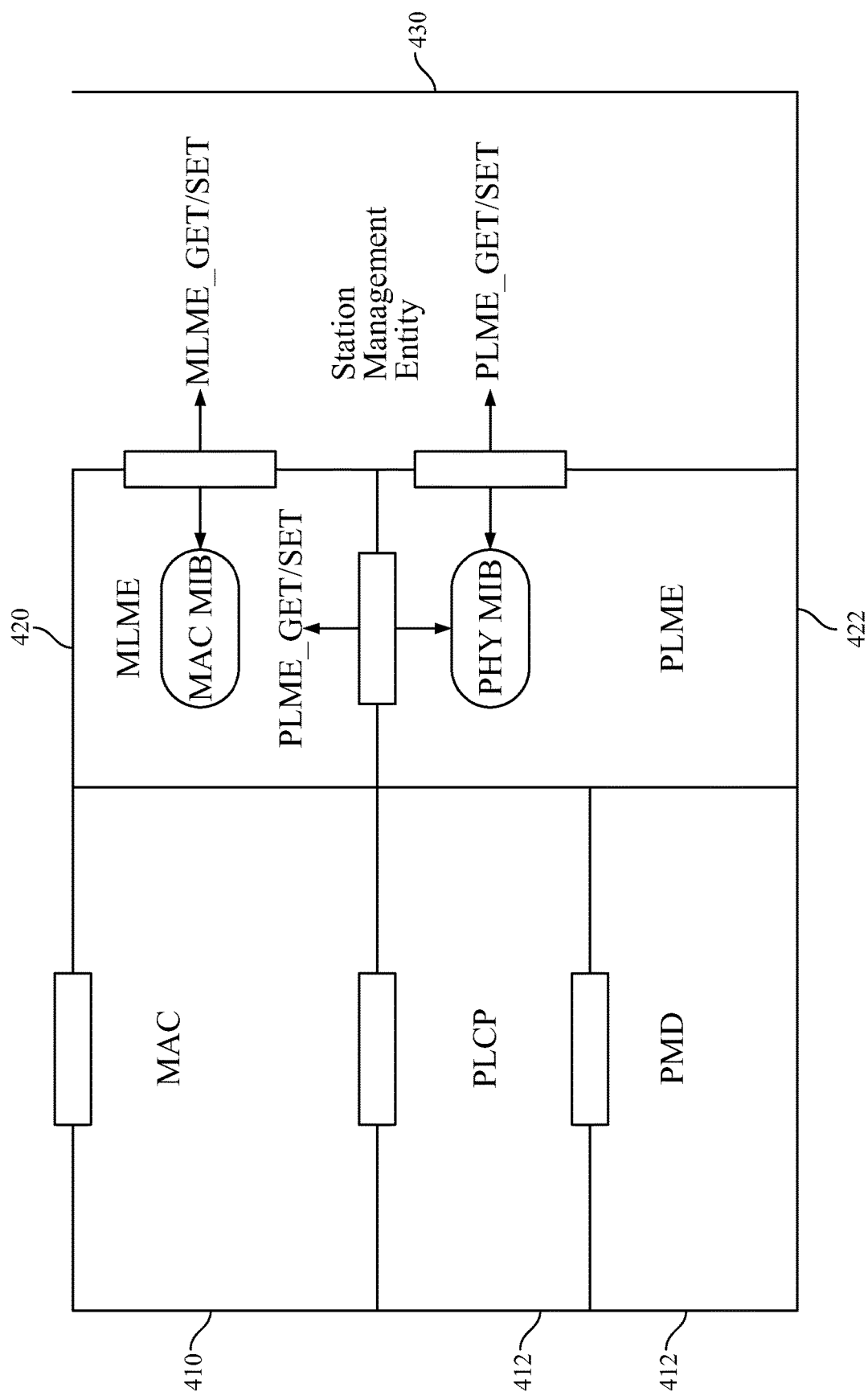
FIG. 4 is a block diagram that illustrates 802.11 Layers and Management Entities.

FIG. 4 illustrates layer and management features of the 802.11 protocol. As shown, Medium Access Control (MAC) 410 sub layer and physical (PHY) layers 412 conceptually include management entities, referred to as MAC Layer Management Entity (MLME) 420 and Physical Layer Management Entity (PLME) 422, respectively. These entities provide the layer management service interfaces through which layer management functions are invoked. In order to provide correct MAC 410 operation, a Station Management Entity (SME) 430 is present within each wireless station (STA). SME 430 is a layer-independent entity that resides in a separate management plane or resides "off to the side." Some of the functions of SME 430 are specified in the 802.11 standard. Typically, SME 430 is responsible for such functions as the gathering of layer-dependent status from the various layer management entities (LMEs) such as MLME 420 and PLME 422, and similarly setting the value of layer-specific parameters. SME 430 may perform such functions on behalf of general system management entities and may implement standard management protocols.

802.11 Radio Resource Management

WLAN Radio Measurements enable STAs (wireless STAtions) to observe and gather data on radio link performance and on the radio environment. An STA may choose to make measurements locally, request a measurement from another STA, or may be requested by another STA to make one or more measurements and return the results.

Radio Measurement data is made available to STA management and upper protocol layers where it may be used for a range of applications. The measurements enable adjustment of STA operation to better suit the radio environment.

To address the mobility requirements of technologies, radio measurements, such as channel load request/report and the neighbor request/report, may be used to collect pre-handoff information, which can drastically speed up hand-offs between cells within the same Extended Service Set (ESS). By accessing and using this information, the STAs (either in the APs or in the individual devices) can make intelligent decisions about the most effective way to utilize the available spectrum, power, and bandwidth for its desired communications.

Generally, the 802.11 radio measurement service may be used for the following: to request and report radio measurements in supported channels; to perform radio measurements in supported channels; to provide an interface for upper layer applications to retrieve radio measurements using MLME primitives and/or MIB access; and to request and receive information about neighbor access points.

Existing Procedures for EPC Access via LTE

Referring back to FIG. 1, in existing systems, for 3GPP LTE access, the UE 124 automatically triggers a PDN connection as part of its initial attachment to the EPC network 104. The UE 124 may subsequently establish additional PDN connections as needed.

When a UE 124 attempts to attach to the EPC 104 via an (H)eNB LTE network 110, it first establishes a Radio Resource Control (RRC) connection with the (H)eNB LTE network 110 and encapsulates the Attach Request within the RRC signaling. The (H)eNB LTE network 110 then forwards the attach request to the MME 112 via S1-AP signaling on the S1-MME interface. The MME 112 retrieves subscription information from the HSS 134 via the Sha interface in order to authenticate the UE 124 and allow attachment to the EPC 104.

After successfully authenticating the UE 124, the MME 112 selects an SGW 114 (e.g., based on proximity to the (H)eNB LTE network 110), and also selects a PGW 108 (e.g., based on the default APN retrieved from HSS 134 or a specific APN requested by UE 124). The MME 112 communicates with the SGW 114 over the S11 interface and requests creation of the PDN connection. The SGW 114 executes the signaling to establish a General Packet Radio Service (GPRS) tunneling protocol (GTP) user plane tunnel with the designated PGW 108 over the S5 interface.

"GTP control" signaling takes place within the S1-AP protocol between the MME 112 and (H)eNB 110. This ultimately leads to the establishment of a GTP user plane tunnel on the S1-U interface between (H)eNB 110 and SGW 114 The path for the PDN connection between the UE 124 and PGW 108 is thus completed through the (H)eNB 110 and SGW 114.

Existing Procedures for EPC Access via TWAN

In existing systems where communications take place via the TWAN 102, UE 116 authentication and EPC 104 attachment is accomplished via Extensible Authentication Protocol (EAP) signaling between the UE 116 and 3GPP AAA Server 106. The PDN connectivity service is provided by the point-to-point connectivity between the UE 116 and the TWAN 102, and concatenated with the S2a bearer(s) between the TWAN 102 and the PGW 108.

When a UE 116 attempts to attach to the EPC 104 via a TWAN 102, it first establishes a Layer 2 connection with the WLAN 118 and encapsulates EAP messages within EAP over LAN (EAPoL) signaling. The WLAN 118 forwards the EAP messages to a TWAP 122 which encapsulates the messages within Diameter signaling and forwards the messages to the 3GPP AAA Server 106 via the STa interface. The 3GPP AAA Server 106 retrieves subscription information from the HSS 134 via the SWx interface in order to authenticate the UE 116 and allow attachment to the EPC 104.

For 3GPP Release 11, the 3GPP AAA Server 106 also provides the TWAN 102 with information via STa interface for establishing a PDN connection to the default PDN provisioned in the HSS 134. The TWAN 102 then exercises GTP control plane (GTP-C) and user plane (GTP-U) protocols over the S2a interface directly toward the PGW 108, thereby completing the PDN connection between the UE 116 and PGW 108 through the TWAN 102.

For 3GPP Release 12, the SaMOG phase-2 work item defines additional procedures for UE-initiated PDN connectivity, multi-PDN connectivity, and seamless inter-system handover. For the case of single-PDN capable TWAN scenarios, EAP extensions are defined to support UE-initiated PDN requests and seamless inter-system handover requests. For the case of multi-PDN capable TWAN scenarios, a WLAN Control Protocol (WLCP) is defined between the UE and TWAN to enable one or more UE PDN connection requests and seamless handover procedures. However, separate procedures are still utilized between the UE and 3GPP AAA Server for UE authentication.

Inter-System Mobility in Integrated Wireless Networks

Under current practices, cellular network and WiFi interworking occurs in the PGW. As shown in FIG. 1, Trusted WLAN Access Network (TWAN) 102 is anchored at PGW 108, i.e. at the center of Mobile Core Network (MCN), such as EPC 104, and there is no direct interface between the Small Cell at the 3GGP LTE Access network 110 and WLAN AP at the TWAN 102 for handover. Handovers between Small Cell and WLAN AP is conducted as a hard switch via the MCN, such as EPC 104. Due to local mobility, access network load balancing, and traffic flow management required by quality of service (QoS), frequently switching between Small Cell and WLAN AP causes interruptions to the user experience of wireless network access, and extra overhead to the MCN, such as EPC 104, with handover preparation and switching control messages. Handling the traffic switching between Small Cell and WLAN smoothly or transparently to the user experience without burdening the MCN with switching signals and/or control messages is a growing problem increasingly important to ISWNs, especially to "Carrier WiFi" solutions. Indeed, communications that rely upon processing at the core of the network have an increased opportunity to be disrupted as the communications travel to and from the network core.

Given the anticipated deployment of many co-located small cell and WiFi access points, Applicants have noted that it would be beneficial to standardize some interworking functionality between the small cell and WLAN. In some mobility and multi-access scenarios, such a capability could reduce user plane switching delays across access technologies and minimize the amount of signaling through the MCN, i.e., to the PGW.

Applicants disclose herein improved systems and methods for inter-system (i.e. inter-RAT herein) mobility in integrated wireless networks. Embodiments described herein provide an enhanced handover between small cell and trusted WLAN in an ISWN via an extended X2 interface (hereinafter referred to as X2'). For example, a handover of a user equipment between a small cell and a WLAN may be determined based on measurement data received from the small cell and the WLAN AP. The measurement data may include signal measurements and traffic load measurements. The handover of the user equipment may be directed, via the X2' interface between the small cell and the WLAN, from the small cell to the WLAN or from the WLAN to the small cell. By extending the X2 interface to the WLAN, handover between the small cells and the WLAN may be conducted in the ISWN and without burdening the EPC with handover signaling and/or messages.

The disclosed systems and methods improve performance by enabling execution of inter-system (i.e. inter-RAT herein) mobility procedures close to the edge of the network. Latency is reduced by minimizing the need for signaling procedures deep in the core network, i.e., toward the PGW. The improved performance and reduced latency resulting from the disclosed systems and methods is especially beneficial in environments where an MNO deploys both small cell and WiFi access in a common geographic area. The disclosed systems and methods, by distributing some inter-system mobility functions away from the core network, improve scalability by reducing the processing burden placed on the PGW.

In an example embodiment, the X2' interface provides extended control plane and user plane communications between small cell 3GPP networks and WiFi networks. It will be appreciated that on the 3GPP side of the internetworking, the node performing the operations may be any suitable node including, for example, an eNB or (H)eNB. On the WiFi side of the internetworking, the node performing the operations may be any suitable node including, for example, any node in a WLAN including one or more of a plurality of WLAN APs that may be comprised in a WLAN. Accordingly, while the description provided herein may refer to operations being performed by a small cell or WLAN, it will be appreciated the processing may be performed by particular nodes such as an eNB or WLAN AP within those networks. In an example embodiment, (H)eNBs and WLANs provide access to their respective networks and therefore may be referred to as access nodes or nodes. The extended control plane communications are supported by extended control protocol stacks, X2'-C, at both the (H)eNB and WLAN. Likewise, the extended user plane communications are supported by extended user plane protocol stacks, X2'-U, at both the (H)eNB and WLAN.

The disclosed handover procedures discussed below are also supported using an extended SWw interface which provides extended control plane and user plane communications between the WLAN AP and UEs. The extended control plane communications are supported by extended control protocol stacks, SWw-C, at both the WLAN AP and UE. Likewise, the extended user plane communications are supported by extended user protocol stacks SWw-U, at both the WLAN AP and the UE.

Procedures for performing handovers between small cell access networks and WLAN APs are described in detail below in connection with FIGS. 10 and 11. The procedures involve extended signaling and data transfers over the extended X2' interface. Extensions to existing messages used in support of the handover operations are noted in the several charts following the discussions of FIGS. 10 and 11.

Example Handover—WLAN to (H)eNB Due to Local Mobility

Figure 5:
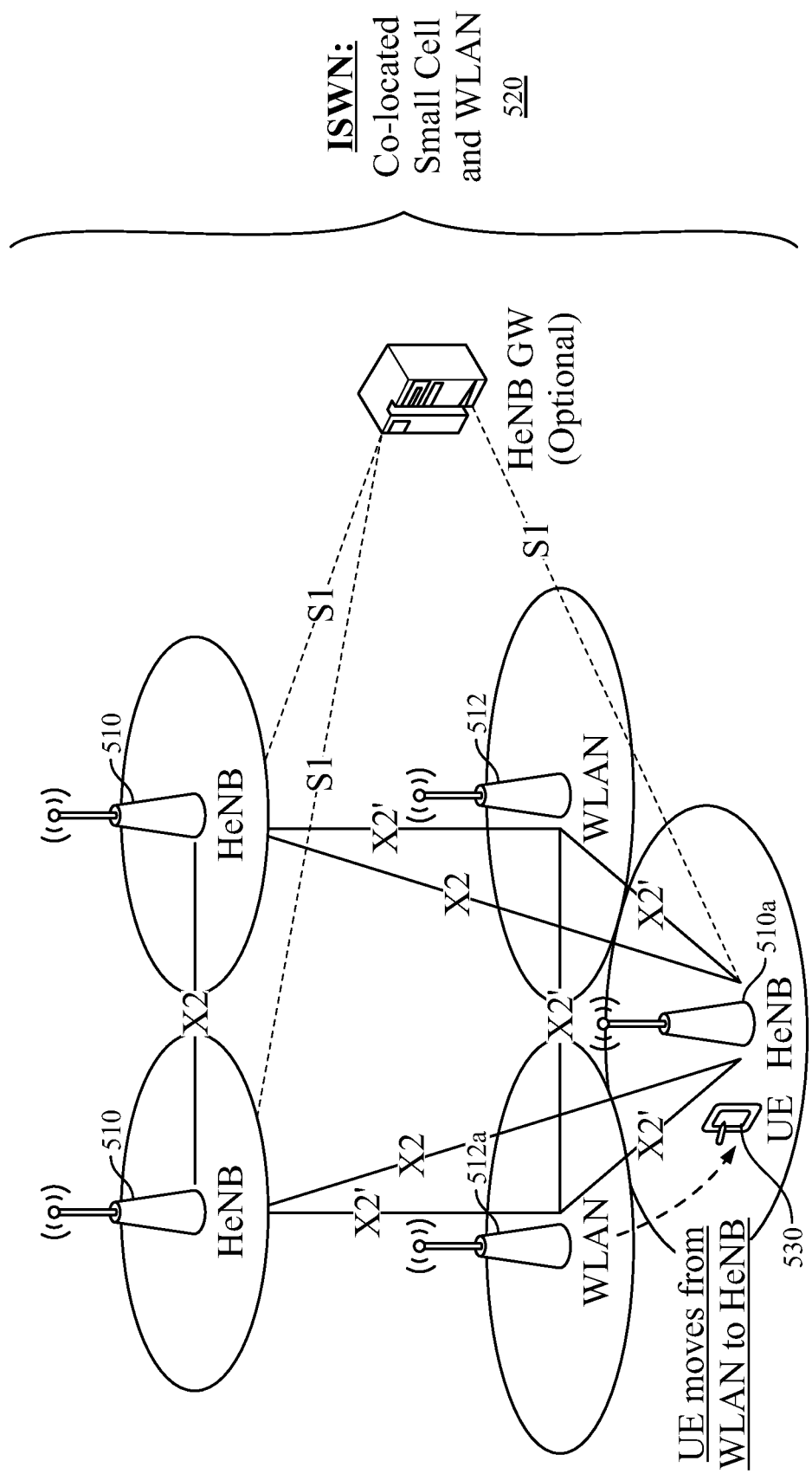
FIG. 5 is a system diagram illustrating handover due to local mobility in accordance with an example embodiment.

The disclosed systems and methods for handover of communications between (H)eNBs and WLANs may be applied to address any number of use scenarios. For example, the disclosed systems and methods may be applied to provide handovers related to local mobility of user equipment. FIG. 5 illustrates handover using an X2' interface due to UE mobility. As shown, a plurality of (H)eNBs 510 and WLANs 512 are co-located and operate in open mode to form an ISWN 520. Extended X2' interfaces provide for communications between (H)eNBs 510 and WLANs 512. In an example scenario, UE 530 may have been previously authenticated with AAA server and have an established GTP tunnel connection with a PGW in the EPC through a WLAN 512*a* access network. When UE 530 moves away from WLAN 512*a*, UE 530 detects decreased received signal strength from WLAN 512*a* and increased received signal strength from (H)eNB 510a. UE 530 communicates a signal to WLAN 512a to perform a handover of communication from WLAN 512a to (H)eNB 510a. As described in detail below, WLAN 512a communicates with (H)eNB 510a via extended X2' interface to coordinate the handover.

Example Handover—(H)eNB to WLAN AP Due to Load Balancing

Figure 6:
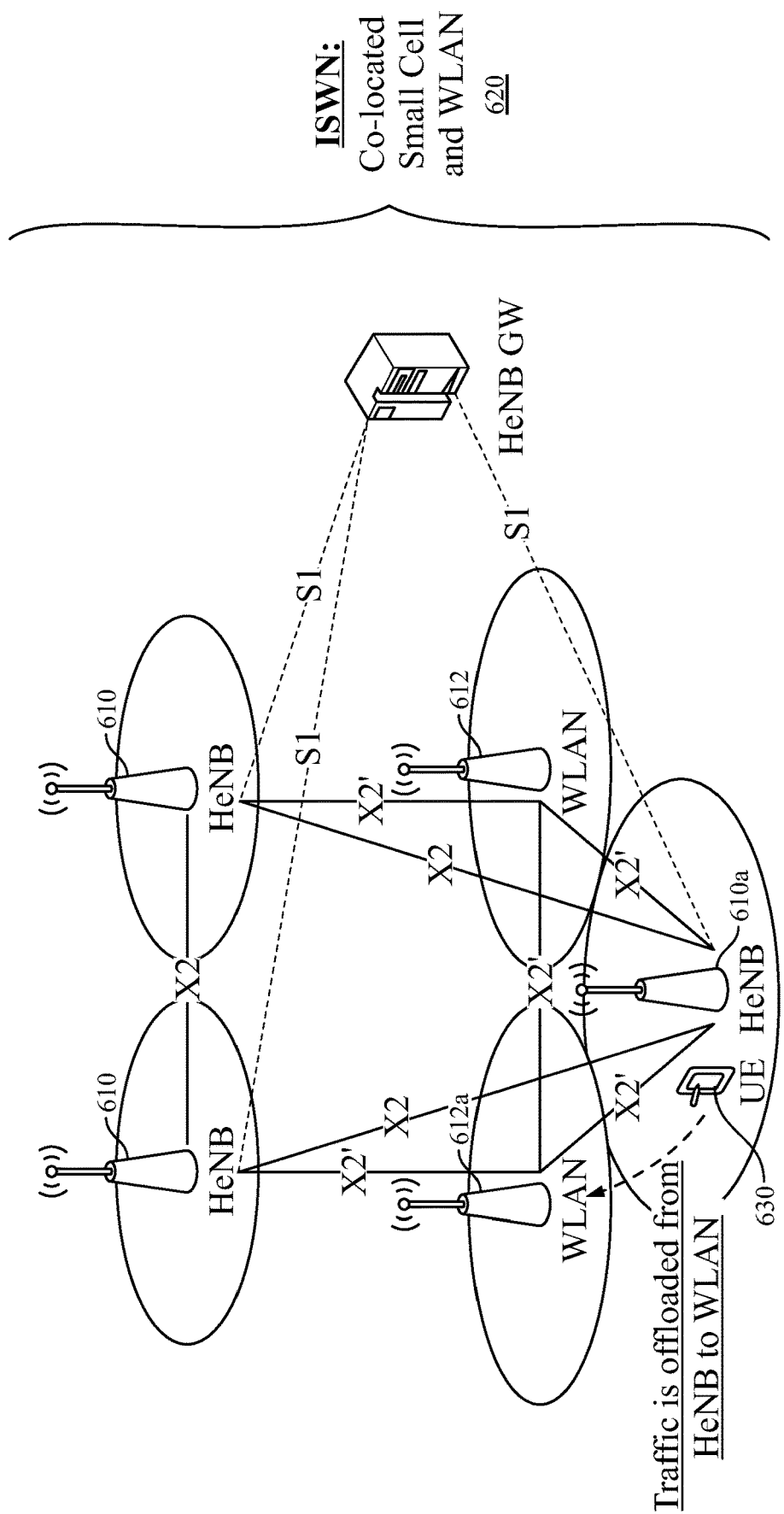
FIG. 6 is a system diagram illustrating handover due to load balancing in accordance with an example embodiment.

In another example scenario, and as illustrated in FIG. 6, the disclosed systems and methods may be applied to provide handovers attendant to load balancing. As shown in FIG. 6, a plurality of (H)eNBs 610 and WLANs 612 are co-located and operate in open mode to form an ISWN 620. (H)eNBs 610 and WLANs 612 have extended X2' interfaces for communications between (H)eNBs 610 and WLANs 612. In an example scenario, UE 630 may have an established GTP tunnel connection with a PGW in EPC through (H)eNB 610a. When (H)eNB 610a becomes overloaded with traffic, it communicates with UE 630 and with WLAN 612a using an extended X2' interface to coordinate a handover from (H)eNB 610a to selected WLAN 612a.

Example Network Architecture for Handover Via X2' Interface

Figure 7:
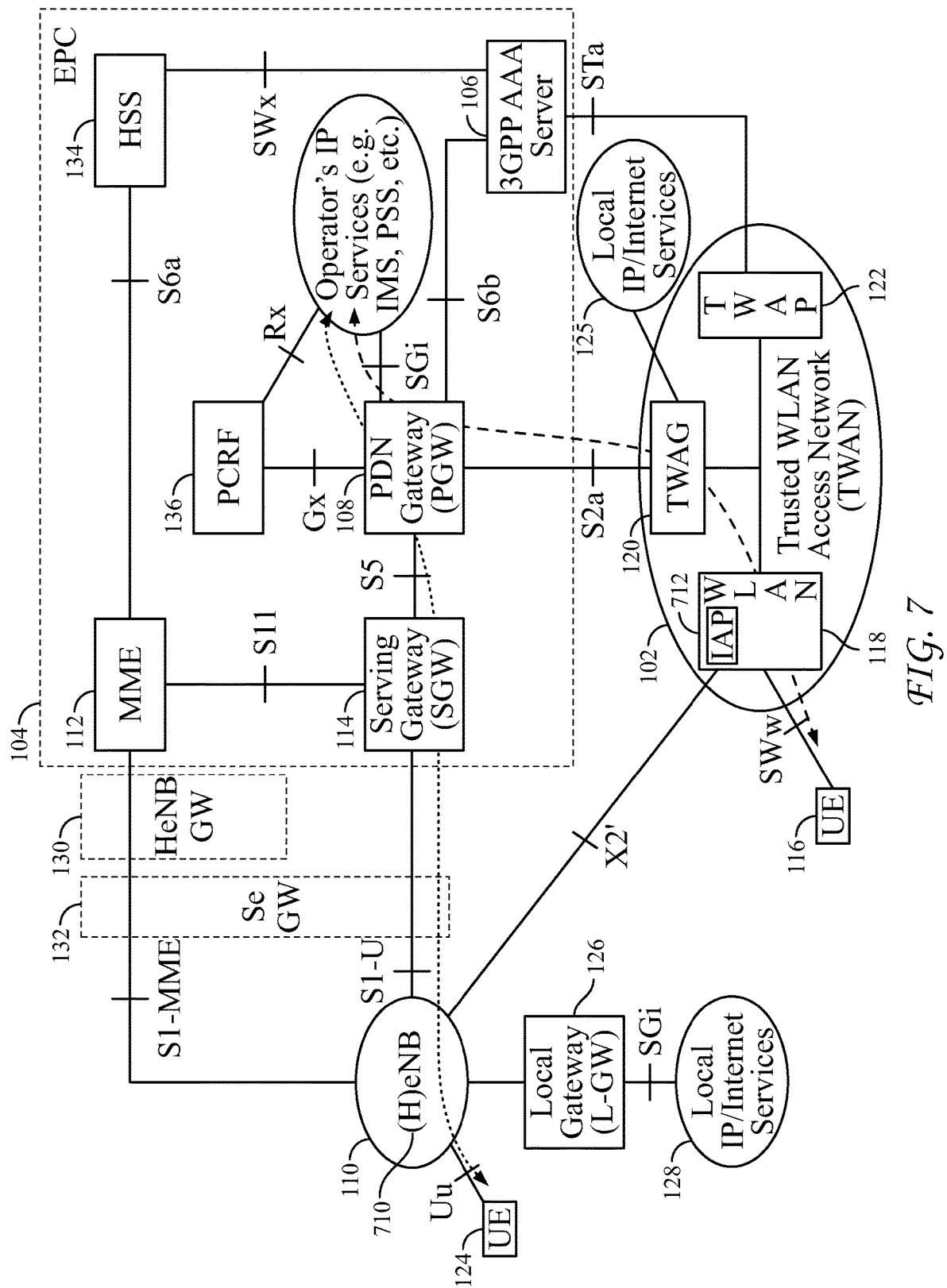
FIG. 7 is a system diagram illustrating a non-roaming architecture for TWAN and 3GPP LTE Access to EPC with an extended X2 interface between (H)eNB and WLAN in accordance with an example embodiment.

FIG. 7 illustrates an example non-roaming architecture for TWAN 102 and 3GPP LTE network 110 access to EPC 104 comprising an X2' interface between an (H)eNB 710 in a 3GPP LTE Access network 110 and WLAN 118 in TWAN 102, for enhanced handover between (H)eNB 710 and WLAN 118. Generally, the architecture operates similarly to that described above in connection with FIG. 1, with the exception that handovers of established communications between UE 123,116 and EPC 104 via one of (H)eNB 710 and WLAN 118 to the other is coordinated by communications via interface X2' between WLAN 118 and (H)eNB 710 as described in detail below in connection with FIGS. 10 and 11. As shown in FIG. 7, an Interfacing Accessing Point (TAP) 712 within WLAN 118 provides supporting functions to the X2' interface between (H)eNB 710 and WLAN 118. For example, the extended protocols and messaging described herein, along with the associated processing, may be implemented by TAP 712. It will be appreciated that TAP 712 may be implemented on any appropriate node within WLAN 118 including, for example, one or more WLAN APs comprised in WLAN 118. Further, while the description herein may refer to processing performed by WLAN 118, in an example embodiments the associated operations may be implemented on one or more WLAN APs including TAP 712 comprised within WLAN 118.

(H)eNB 710 and WLAN 118 with an X2' interface formed there between may be implemented using suitable computing systems, such as, for example, computing systems described below in connection with FIGS. 14 and 15. (H)eNB 710 and WLAN 118 may be implemented as logical entities such as, for example, using software which may execute either on a standalone node or server or as part of an existing node or server. It will be appreciated that in an example embodiment, (H)eNB 710 and WLAN 118 may be co-located and have a physical connection there between over which X2' communications may travel.

Example X2' Protocol Stacks

Figure 8A:
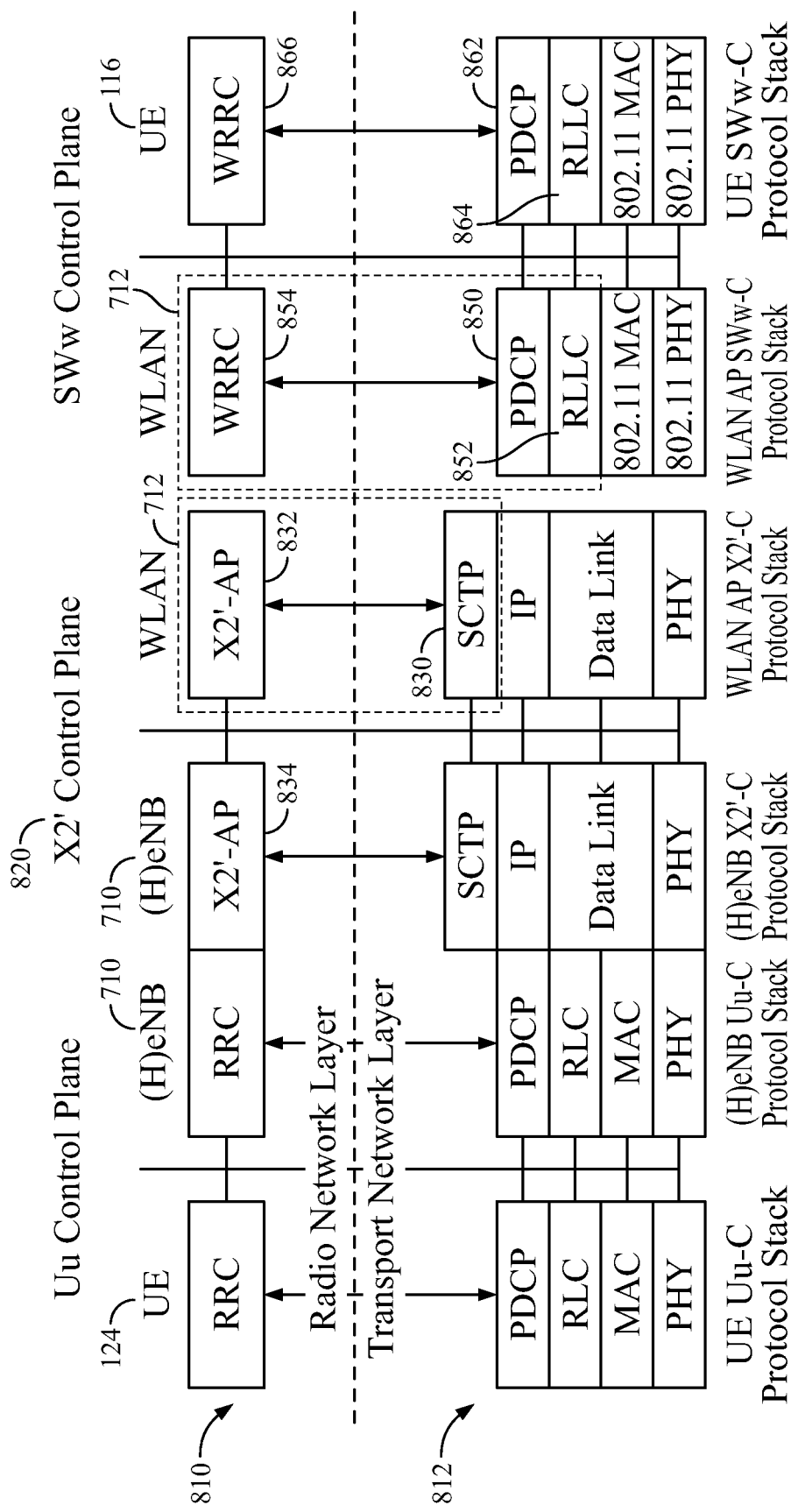
FIG. 8A is a block diagram illustrating a control plane of an extended X2 interface in accordance with an example embodiment.
Figure 8B:
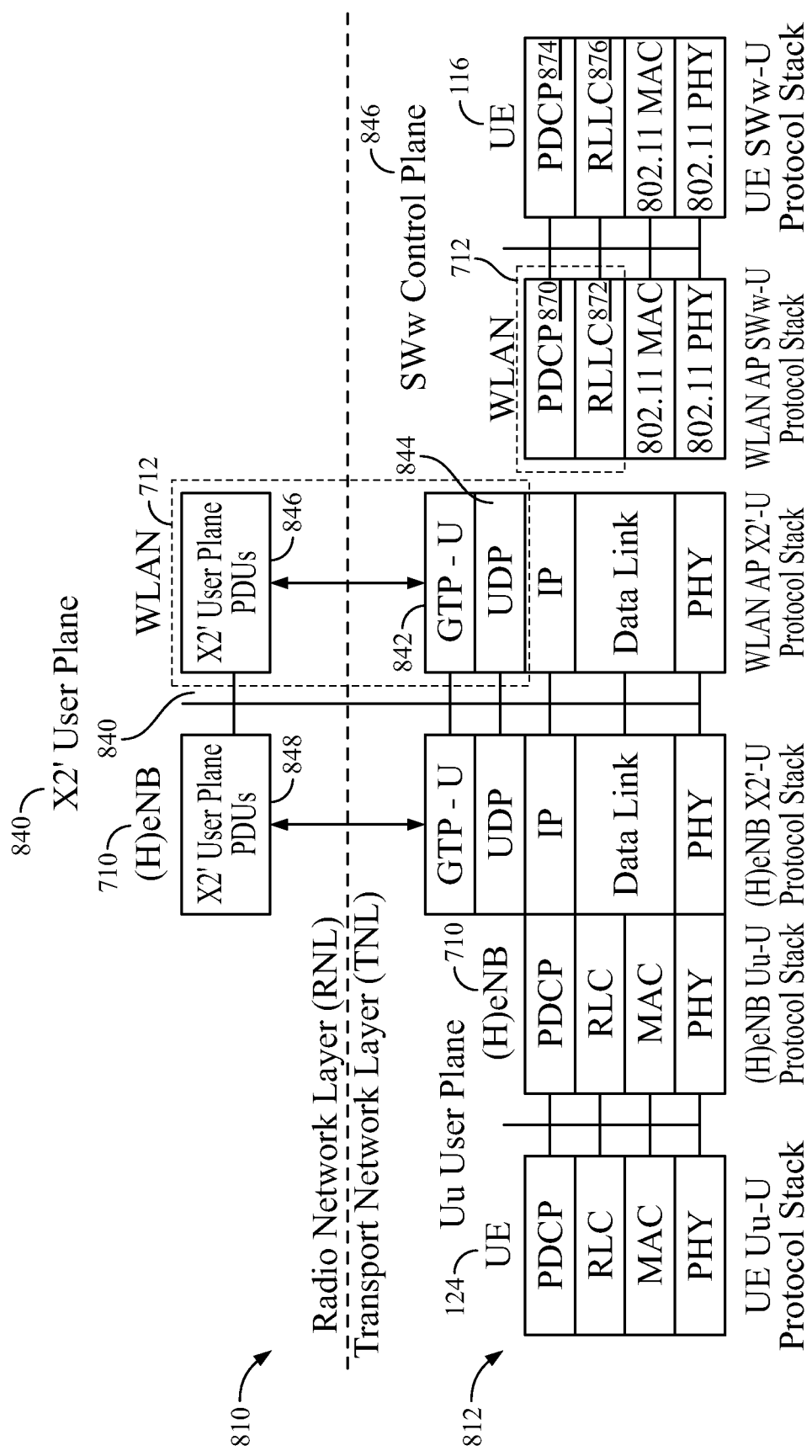
FIG. 8B is a block diagram illustrating a user plane of an extended X2 interface protocol stack in accordance with an example embodiment.

FIG. 8A and FIG. 8B illustrate example control plane and user plane protocol stacks, respectively, for the X2' interface, SWw interface, and Uu interface as they may be used in connection with performing a handover of communications from one of either (H)eNB network 110 and TWAN 102 to the other. Referring to FIG. 8A, the protocol stacks for control plane signaling in both the radio network layer 810 and transport network layer 812 are illustrated. New and enhanced portions of the protocol stacks are noted by shading. As shown, the control plane for the Uu control interface between UE 124 and (H)eNB 710 is unchanged as are the related protocol stacks UE Uu-C and (H)eNB Uu-C. The existing SWw control plane and corresponding protocol stacks WLAN SWw-C and UE SWw-C for communication between WLAN 118 and UE 116 have been extended to facilitate handovers of communication between (H)eNB 710 and WLAN 118. Likewise, the X2' interface represents an extension to the X2 interface so as to allow for direct signaling and data exchange between (H)eNB 710 and WLAN 118. The direct signaling avoids passing control messages and re-routing data through the mobile core network (MCN) of the EPC 104 and thereby relieves the MCN of performing frequent handovers between collocated (H)eNB 710 and WLAN 118. As noted above in connection with FIGS. 5 and 6, the X2' protocol may be used, for example, in processing handovers of UE communication between collocated (H)eNBs 710 and a WLAN 118 for purposes of mobility management and/or load management.

X2' control interface 820 (X2'-C) is an enhanced X2-C control plane interface that provides direct signaling between (H)eNB 710 and WLAN 118. As shown in FIG. 8A, with respect to the WLAN X2'-C protocol stack, a Stream Control Transmission Protocol (SCTP) 830 logically sits on top of the Internet Protocol (IP) layer. SCTP 830 matches the SCTP layer in the TNL 812 (H)eNB X2'-C protocol stack of (H)eNB 710. The Stream Control Transmission Protocol (SCTP) is described in Internet Engineering Task Force (IETF) Request for Comments (RFC) 4960 "Stream Control Transmission Protocol," the contents of which are hereby incorporated herein by reference in their entirety. The Internet Protocol is described in IETF RFC 791 "Internet Protocol," the contents of which are hereby incorporated herein by reference in their entirety.

SCTP 830 operates differently than conventional WLAN Transmission Control Protocol (TCP) which is described in IETF RFC 793 and 1122, the contents of which are hereby incorporated by reference in their entireties. SCTP 830 transports various X2'-C signaling over IP network. Like the SCTP under X2-AP, which is described in 3GPP TS 36.422, the contents of which are hereby incorporated by reference in its entirety, a single SCTP association per X2'-C interface instance may be used with one pair of stream identifiers for X2'-C common procedures.

Referring to FIG. 8A, X2'-AP layer 832 has been added to the WLAN X2'-C protocol stack in the Radio Network Layer (RNL) 810. X2'-AP layer 832 provides enhanced application layer signaling for control and management messages between WLAN 118 and its peer (H)eNB 710. X2'-AP layer 834 has similarly been added to (H)eNB X2'-C protocol stack in the RNL 810 and provides enhanced application layer signaling protocol for (H)eNB 710 for the control and management messages between (H)eNB 710 and its peer WLAN 118. X2'-AP 832 and X2'-AP 834 may employ X2-AP messages such as is described in 3GPP TS 36.422, the contents of which are hereby incorporated by reference, which have been enhanced and/or extended for the inter-signaling between (H)eNB 710 and WLAN 118. The protocol stack and message enhancements that implement the interworking functions added to WLAN to support the X2' interface between (H)eNB and WLAN may apply to numerous functions including handover signaling associated with, for example, mobility management and load management. The functions may comprise, for example: handover preparation; control of user plane transport bearers between source (H)eNB/WLAN and target WLAN/(H)eNB; UE context transfer from source (H)eNB/WLAN to target WLAN/(H)eNB; and handover cancellation.

Generally, the X2 Application Protocol (X2-AP) is explained in 3GPP TS 36.423 "Evolved Universal Terrestrial Radio Access Network (E-UTRAN); X2 Application Protocol (X2AP)," which is incorporated by reference in its entirety as if the disclosure of which is set forth in its entirety herein. With respect to the extended X2'-AP protocol, the element procedures and messages are summarized below in Table 1.

TABLE 1

X2'AP Elementary Procedures and Messages

| Elementary Procedure | Initiating Message | Successful Outcome Response message | Unsuccessful Outcome Response message |
|---|---|---|---|
| Handover Preparation | HANDOVER REQUEST | HANDOVER REQUEST ACKNOWLEDGE | HANDOVER PREPARATION FAILURE |
| X2' Setup | X2' SETUP REQUEST | X2' SETUP RESPONSE | X2' SETUP FAILURE |
| Resource Status Reporting Initiation | RESOURCE STATUS REQUEST | RESOURCE STATUS RESPONSE | RESOURCE STATUS FAILURE |
| SN Status Transfer | SN STATUS TRANSFER | | |
| UE Context Release | UE CONTEXT RELEASE | | |
| Resource Status Reporting | RESOURCE STATUS UPDATE | | |
| Handover Cancel | HANDOVER CANCEL | | |
| Handover Report | HANDOVER REPORT | | |

Referring to FIG. 8B, the protocol stacks for user plane data messages in both the radio network layer (RNL) 810 and transport network layer (TNL) 812 are illustrated. New and/or enhanced portions of the protocol stacks are noted by shading. As shown, the user plane protocols for the Uu user plane interface between UE 124 and (H)eNB 710 is unchanged. The existing SWw user plane protocol between WLAN 118 and UE 116 has been extended to facilitate handovers of communication between the UE and the EPC 104 from (H)eNB 710 to WLAN 118. The X2' user plane interface 840 has been extended to include protocols for direct data exchange between (H)eNB 710 and WLAN 118. The direct data exchange avoids re-routing data through the mobile core network (MCN) and thereby relieves the MCN of performing frequent handovers between collocated (H)eNB 710 and WLAN 118, and ensures seamless handover between (H)eNB 710 and WLAN 118.

Referring to FIG. 8B, the X2'-U user plane interface 840 between (H)eNB 710 and WLAN 118 provides non-guaranteed delivery of user plane Protocol Data Units (PDUs). With respect to WLAN 118, and in particular the WLAN X2'-U protocol stack, in the transport network layer 812 a General Packet Radio System (GPRS) Tunneling Protocol User Plane (GTP-U) 842 and User Datagram Protocol (UDP) 844 have been added on top of Internet Protocol (IP). GTP-U 842 and UDP 844 match corresponding layers in peer (H)eNBs X2'-U protocol stack. The GPRS GTP-U is described in 3GPP TS 29.281 "General Packet Radio System (GPRS) Tunneling Protocol User Plane (GTPv1-U)," the contents of which are hereby incorporated herein by reference as if set forth herein in its entirety. The UDP is described in IETF RFC 768 "User Datagram Protocol," the contents of which are hereby incorporated herein by reference in its entirety. Like the X2-U interface described in 3GPP TS 36.424 "Evolved Universal Terrestrial Radio Access Network (E-UTRAN); X2 data transport," which is hereby incorporated by reference in its entirety, the WLAN TNL 812 may be built on IP transport, and GTP-U 842 may be used on top of UDP/IP 844, which is different from conventional WLAN's TCP/IP, to carry encapsulated user plane PDUs between (H)eNB and WLAN's GTP-U Tunnel Endpoint.

In an example embodiment, there may be none or one uplink (UL) data stream and none or one downlink (DL) data stream per transport bearer which is identified by the GTP-U Tunneling Endpoint Identifier (TEID) in GTP header and the IP address for WLAN 118 at the X2'-U interface. The identity of a transport bearer, allocated by the target (H)eNB/WiFi, may be signaled in the X2' control plane. According to another aspect of an example embodiment, the Down Link (DL) data stream is used for DL data forwarding from the source (H)eNB/WLAN to the target WLAN/(H)eNB. According to another aspect of an example embodiment, the Up Link (UL) data stream is used for UL data forwarding from the source (H)eNB/WLAN to the target WLAN/(H)eNB. Each data stream is carried on a dedicated transport bearer.

Referring to FIG. 8B, X2'-U PDU 846 has been added to the WLAN AP X2'-U protocol stack in the RNL 810. X2'-U PDU 846 provides for PDU based data forwarding between WLAN 118 and its peer (H)eNB 710 during handovers. X2'-U PDU 848 has similarly been added to (H)eNB X2'-U protocol stack in RNL 810 and provides for PDU based data forwarding between (H)eNB 710 and WLAN 118.

As illustrated in FIGS. 8A and 8B, the SWw interface protocol stacks for both the control plane (FIG. 8A) and user plane (FIG. 8B). Referring to FIG. 8A, and in particular to the WLAN SWw-C control protocol stack, Packet Data Convergence Protocol (PDCP) 850 and Radio and Logic Link Control (RLLC) 852 are located on top of WLAN's MAC layer in the Transport Network Layer (TNL) 812. WLAN Radio Resource Control (WRRC) 854 is located in Radio Network Layer (RNL) 810. The WLAN SWw-C protocol stack thereby corresponds to the (H)eNB Uu-C protocol stack of the peer (H)eNB. The PDCP 850 is described in 3GPP TS. 36.323 "Evolved Universal Terrestrial Radio Access Network (E-UTRAN); Packet Data Convergence Protocol (PDCP) specification," the contents of which are hereby incorporated by reference in its entirety.

Although similar to the conventional 802.11.2 based Logic Link Control (LLC), the RLLC protocol also provides the channels for passing control and/or management messages from WRRC to WLAN AP MAC layer and provides detection and/or measurement reports from WLAN MAC layer to WRRC 808 for radio resource control or management which may be needed for the Handover (HO) between (H)eNB 710 and WLAN 118 via the X2' interface.

Similar to the PDCP on the Uu interface stack, PDCP is used for WLAN over RLLC for in-sequence delivery of upper layer PDUs at WLAN TNL, which enables the SN status transfer during the HO between WLAN 118 and its peer (H)eNB 710 via the X2' interface.

Similar to Radio Resource Control (RRC) for Uu interface, WRRC may control or manage the configuration, establishment, maintenance and release of a radio connection or point to point Radio Bearer(s) between the UE 116 and WLAN 118. WRRC also contains the functions to UE measurement reporting and the control of the reporting. WRRC may also support security key management and QoS management functions.

Referring to FIG. 8A, UE's SWw-C control protocol stack is configured to correspond to WLAN's SWw-C protocol stack. More particularly, UE's SWw-C comprises PDCP 862 and RLLC 864 located on top of the UE's MAC layer of the TNL 812. WRRC 866 is located in RNL 810. Accordingly, UE SWw-C protocol stack corresponds to the SWw-C protocol stack of the peer WLAN and is adapted for communication of control signals between UE 116 and WLAN 118.

Referring to FIG. 8B, WLAN and UE share a SWw user plane interface. As shown, both WLAN's SWw-U protocol stack and the UE's SWs-U protocol stack feature PDCP 870, 874 and RLLC 872, 876 positioned on top of the physical and MAC layers. Accordingly, the UE's SWw-U protocol stack is configured to correspond to the WLAN's SWw-U protocol stack.

As noted above, new and enhanced portions of the protocol stack are noted with shading. With respect to the WLAN 118, the enhanced portions of the protocol stack may be implemented by IAP 712 which may be comprised in one or more nodes of WLAN 118 such as, for example a WLAN AP. In FIGS. 8A and 8B, the enhanced portions of the protocol stack implemented by WLAN 118 have been designated as corresponding to IAP 712.

Figure 9:
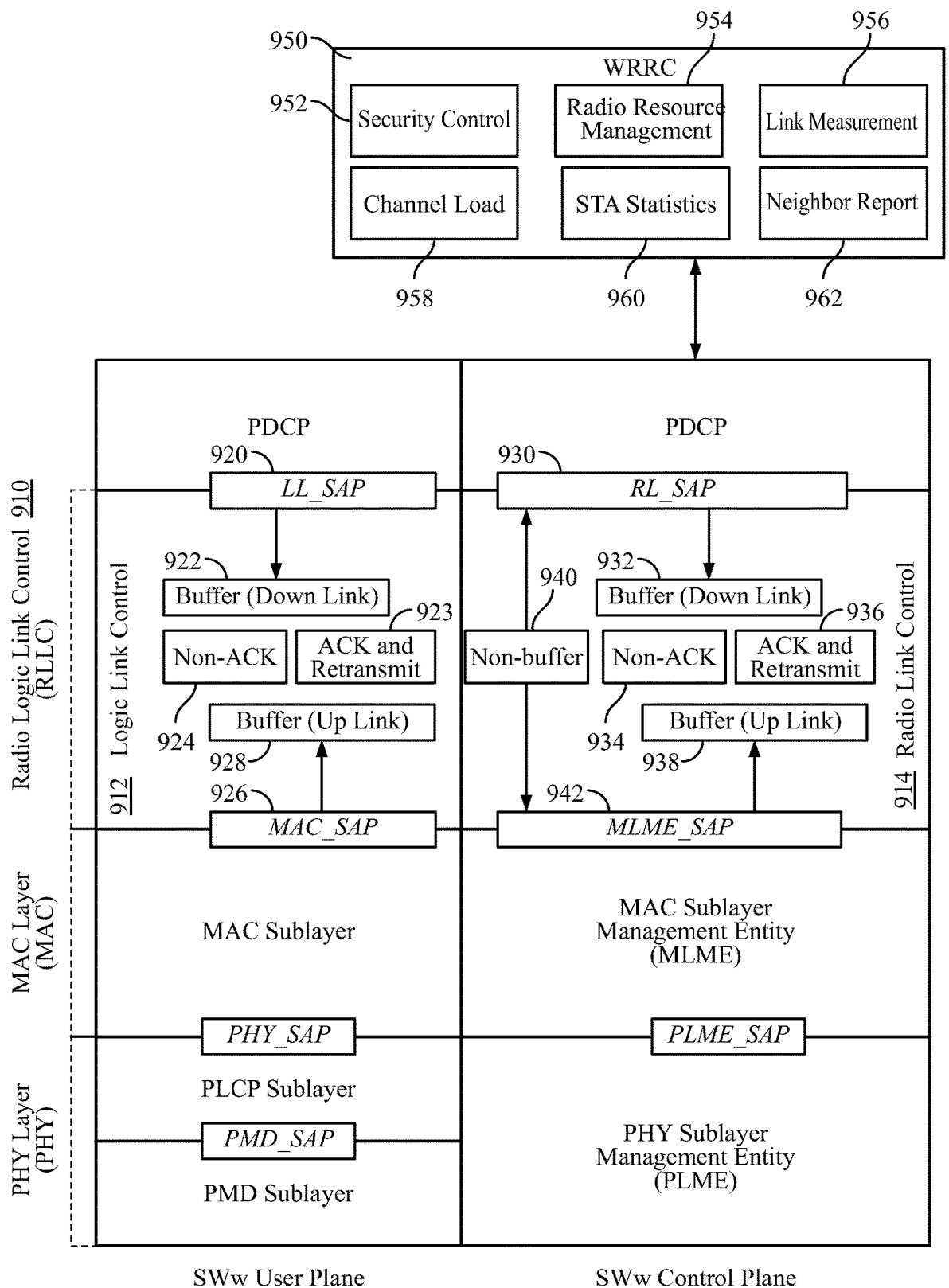
FIG. 9 is a block diagram that illustrates an example SWw Protocol Stack.

FIG. 9 provides a diagram illustrating component layers of the SWw user plane and control planes for both the WLAN 118 and UE 116. In particular, FIG. 9 illustrates component functions provided by the Radio and Logic Link Control (RLLC) and WLAN Radio Resource Control (WRRC) layers of the WLAN and UE protocol stacks. As shown, the Radio Logic Link Control (RLLC) 910 contains Logic Link Control 912 in the user plane and Radio Link Control 914 in the control plane.

The Logic Link Control 912 comprises LL_SAP interface 920 for communicating data with the PDCP level. The data is received into and out of buffer 922. Logic Link Control 912 has an acknowledgement mode (ACK) 923 and a non-acknowledgement (Non-ACK) mode 924. If the acknowledgement mode is enabled, failed packet(s) may be retransmitted. A MAC_SAP interface 926 receives/transmits data from/to the MAC sublayer. The data is received into and out of buffer 928.

Radio Link Control 914 in the control plane comprises RL_SAP interface 930 for communicating control signaling or messages with the PDCP level. Data is received into buffer 932. Non-buffer 940 may be used for low latency probing or signaling. Buffered acknowledgement (ACK) mode 934 and/or non-acknowledgement (Non-ACK) mode 936 may be used for control messages. ACK and retransmission may be enabled for reliable control message transmitting. MLME_SAP interface 942 provides for exchange of information between the Radio Link Control 914 and MLME for MAC management messages.

Similar to Radio Resource Control (RRC) for LTE Uu interface, WRRC 950 at the WLAN SWw interface controls or manages the configuration, establishment, maintenance and release of a radio connection or point to point Radio Bearer(s) between the UE 116 and WLAN 118. WRRC 950 also contains the functions for UE measurement reporting and the control of the reporting via the RL_SAP interface to RLLC function of the SWw control-plane stack. WRRC 950 may also support security key management and QoS management functions.

As shown in FIG. 9, WRRC 950 features for WLAN radio resource control and management may be grouped into several functional areas. For example, Security Control 952 provides key generation and management. Radio Resource Management 954 provides channel monitoring, channel allocation, measurement pause, etc. Link Measurement 956 provides channel noise histogram, interference, received signal strength, received signal and interference and noise ratio, etc. Channel Load 958 provides channel utilization, associated STA number, accessing latency, packet rate, etc. STA Statistics 960 provides STA counters, BSS average access delay, frame duplicate count, Request To Send (RTS) failure count, ACK failure count, etc. Neighbor Report 962 provides detected or known neighbor APs as candidates for a Service Set (SS) transition.

Example Handover Processing Using X2' Interface

The X2' interface established between the (H)eNB 710 and the WLAN 118 may be used to handover communications between a UE and the EPC from one of an (H)eNB and WLAN to the other. Preparation and switching messages as well as buffered data may be exchanged directly between an (H)eNB and WLAN via X2' interface without EPC involvement.

Numerous different scenarios may require handover of communications from one of an (H)eNB and WLAN to the other. Two scenarios are discussed below. It will be appreciated that the mechanisms demonstrated in these two use cases may also be applicable to different switching scenarios using X2' interface, such as handover from WLAN to WLAN via X2' between WLANs.

Handover from WLAN to (H)eNB using X2' Interface

Figure 10A:
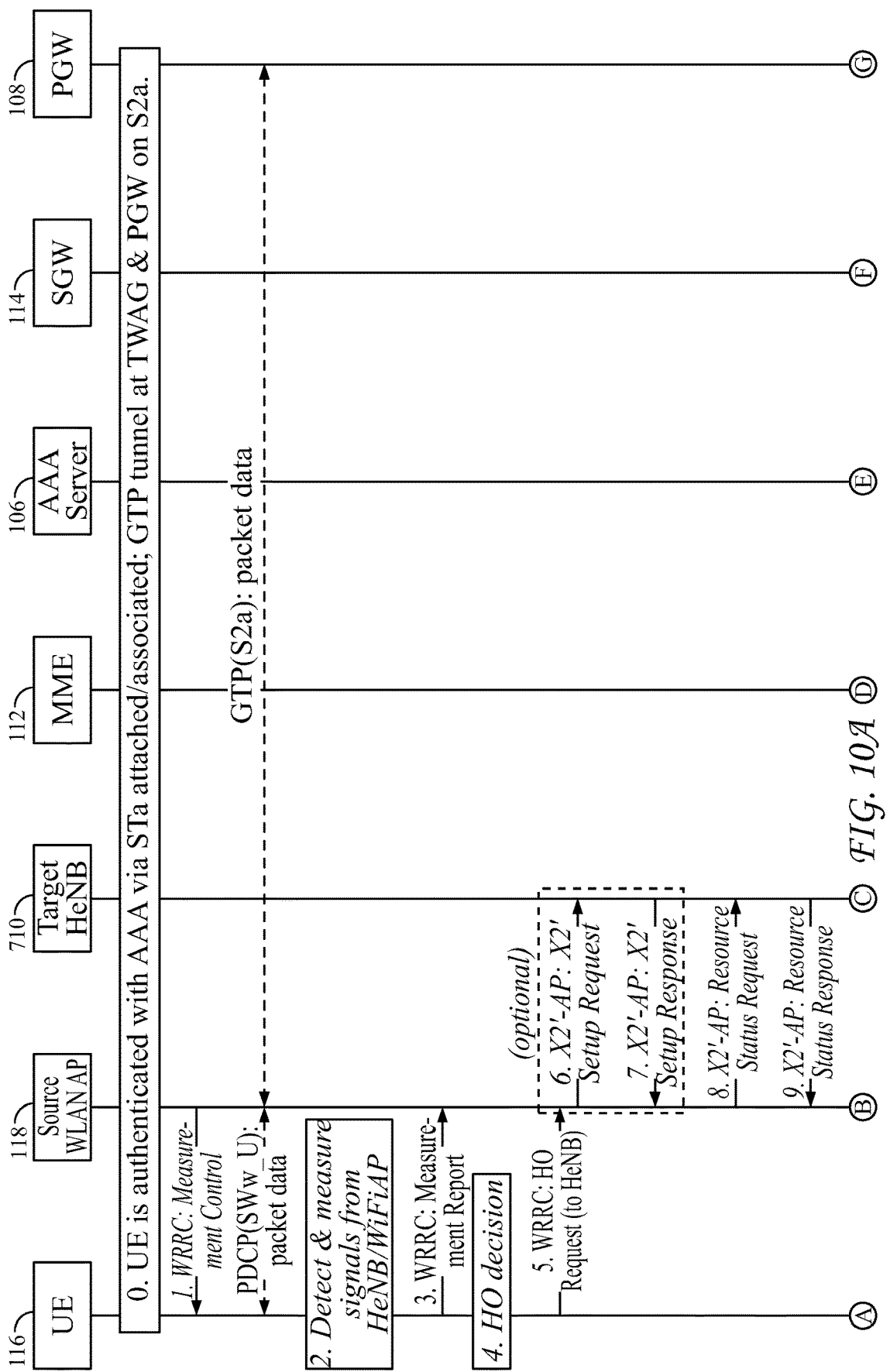
FIGS. 10A-C depict a flow diagram illustrating a user equipment initiated handover from WLAN to (H)eNB via the extended X2 interface in accordance with an example embodiment.
Figure 10B:
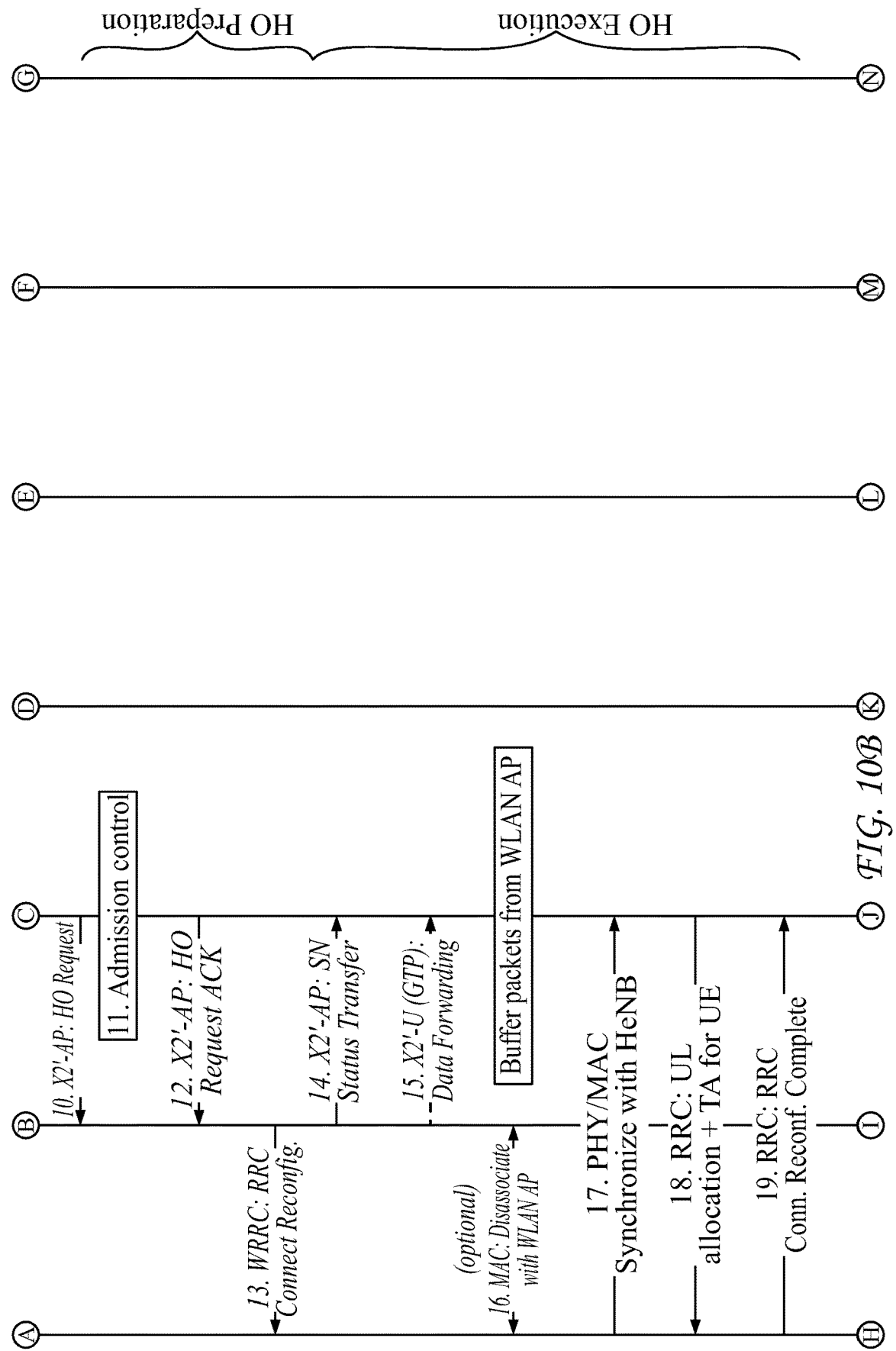
Figure 10C:
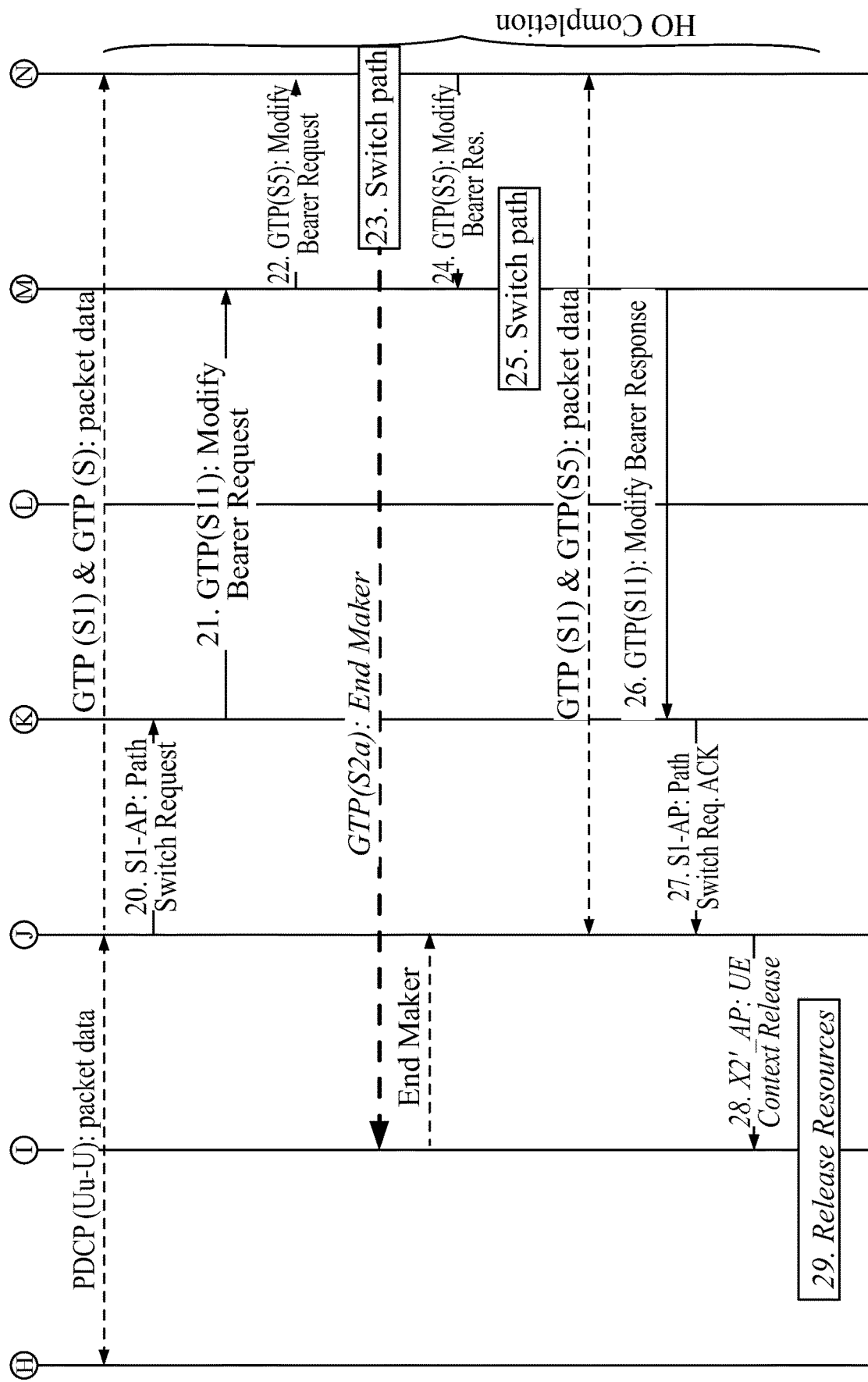

A handover of communications from a WLAN to a (H)eNB as a result of movement of a UE was previously discussed in connection with FIG. 5. FIGS. 10A-C provide a diagram illustrating various example processing steps in performing a handover from a WLAN to an (H)eNB.

Referring to FIG. 10A, at step 0, a UE 116 establishes or has previously established a communication path with EPC 104 via WLAN 118. In an example embodiment, UE 116 may have previously conducted Non-3GPP Access Authentication with AAA server 106 via STa interface, attached and associated with EPC elements, and established bearer(s) and tunnel(s) for data. The Non-3GPP Access Authentication with AAA server 106 is described in 3GPP TS 33.402 "3GPP System Architecture Evolution: Architecture Enhancements for non-3GPP accesses" and 3GPP TS 29.273 "Evolved Packet System (EPS); 3GPP EPS AAA interfaces," the contents of both of which are hereby incorporated by reference in its entirety. Data packets may be transferred from/to UE 116 to/from the EPC 104 via a GTP tunnel terminated at PGW 108 in EPC 104 via S2a interface.

At step 1 of FIG. 10A, WLAN 118 performs measurement preparation procedures. In an example embodiment, WLAN 118, and in particular, using source WLAN's WRRC protocol layer, configures UE 116 neighbor (H)eNB/WLAN AP detection and measurement procedures with the parameter values and thresholds according to area restriction information. WLAN 118 communicates to UE 116 information for configuring UE 116 to measure signals from at (H)eNBs in the area.

As illustrated in FIG. 10A, packet data may be communicated between UE 116 and source WLAN 118. Likewise, data may be communicated between WLAN 118 and PGW 108.

At step 2 of FIG. 10A, UE 116 performs signal detection and measurement. In an example embodiment, UE 116 detects and measures the signals sent from neighbor (H)eNB(s) and/or WLAN AP(s).

At step 3 of FIG. 10A, UE 116 prepares and transmits, and WLAN 118 receives a measurement report. In an example embodiment, UE 116 may send a MEASUREMENT REPORT message to WLAN 118 with the detection and measurement by the rules set by system information, specification, etc., as well as the configuration parameters sent by source WLAN 118. As shown in FIG. 10A, the report may be communicated using at least the WRRC layer of the protocol stack. In an example scenario, the report comprises information regarding signals received from (H)eNB 710.

At step 4 of FIG. 10A, UE 116 makes a handover decision. In an example scenario, UE 116 may, based on the detected and measured results, determine to switch from WLAN 118 to (H)eNB 710 for better service with stronger received signal and/or lower interference.

At step 5 of FIG. 10A, UE 116 makes the handover request. In an example embodiment, UE 116 generates and transmits an HO REQUEST message to source WLAN 118 with information identifying the handover communication to (H)eNB including the detected information which may be, for example, cell ID and measured information such as Received Signal Strength Indicator (RSSI), Channel Quality Indicator (CQI) etc., which relate to the target (H)eNB 710, as well as the UE context associated with HO. As shown in FIG. 10A, the communications may be made using at least the WRRC layer of the protocol stack.

It will be appreciated that in some scenarios, it may be appropriate to skip steps 4 and 5. For example, steps 4 and 5 may not be needed where the handover is initiated by WLAN 118 rather than by UE 116.

At step 6 of FIG. 10A, WLAN 118 generates an X2' interface setup request. In an example embodiment, source WLAN 118 sends an X2' SETUP REQUEST message via the X2' interface to the target (H)eNB 710 if there is currently no X2' session existing between source WLAN 118 and target (H)eNB 710 based on the detected information from UE 116.

At step 7 of FIG. 10A, (H)eNB 710 generates an X2' interface setup response. In an example embodiment, target (H)eNB 710 sends an X2' SETUP RESPONSE message via the X2' interface to confirm the success of X2' setup between source WLAN 118 and target (H)eNB 710.

It will be appreciated that in some scenarios, it may be appropriate to skip steps 6 and 7. For example, steps 6 and 7 may be omitted if the X2' session has been established already.

At step 8 of FIG. 10A, WLAN 118 requests a status of resources from (H)eNB 710. In an example embodiment, WLAN 118 generates and transmits an X2' RESOURCE STATUS REQUEST via the X2' interface to the target (H)eNB 710 for load information. The request may specify, for example, to collect information regarding the processing load and capacity of (H)eNB 710.

At step 9 of FIG. 10A, (H)eNB 710 generates and transmits, and WLAN 118 receives responsive load information. In an example embodiment, (H)eNB 710 generates and transmits an X2' RESOURCE STATUS RESPONSE message with load measurements to source WLAN 118 via the X2' interface. The load measurements may contain an suitable information relating to the processing load of (H)eNB 710.

At step 10 of FIG. 10B, WLAN 118 generates and transmits a handover request. In an example embodiment, source WLAN 118 generates and transmits via the X2' interface a HANDOVER REQUEST message to the target (H)eNB 710 with necessary handover information. For example, the handover information may specify UE Context, providing security context information, radio bearer (RB) context, and target (H)eNB information as configured and reported by WRRC. The information is communicated to target (H)eNB 710 to proceed further in continuing the UE 116 initiated handover procedure based on the received RESOURCE STATUS RESPONSE from the target (H)eNB 710.

At step 11 of FIG. 10B, (H)eNB 710 performs handover admission control. In an example embodiment, target (H)eNB 710 performs HO Admission Control based on the received UE Context and RB Context as well as the E-UTRAN Radio Access Bearer (E-RAB) QoS information to increase the likelihood of a successful handover. The target (H)eNB 710 configures the required resources according to the received E-RAB QoS information.

At step 12 of FIG. 10B, (H)eNB 710 transmits a handover request acknowledgement. In an example embodiment, target (H)eNB 710 prepares a handover with L1/L2 and sends the HANDOVER REQUEST ACKNOWLEDGE via the X2' interface to the source WLAN 118. The HANDOVER REQUEST ACKNOWLEDGE message includes a transparent container to be sent to the UE 116 as an RRC message from (H)eNB 710 to perform the handover.

At step 13 of FIG. 10B, WLAN 118 transmits a command to UE 116 to perform a handover. In an example embodiment, WLAN 118 generates and transmits to UE 116 a RRCConnectionReconfiguration message along with necessary parameters such as, for example, new C-RNTI, target (H)eNB security algorithm identifiers, and optionally dedicated RACH preamble, target (H)eNB SIBs, etc. The message may further comprise Radio Network Layer (RNL)/Transport Network Layer (TNL) information for the forwarding tunnels, if necessary. As shown in FIG. 10B, the communications may be made using at least the WRRC layer of the protocol stack.

At step 14 of FIG. 10B, WLAN 118 transmits status information regarding communication with the UE 116 to the (H)eNB 710 via the X2' interface. In an example embodiment, WLAN 118 generates and transmits a SN STATUS TRANSFER message to the target (H)eNB 710 via the X2' interface to convey the uplink and downlink PDCP SN and Hyper Frame Number (HFN) of RBs. transferring status of communication with the mobile computing device At step 15 of FIG. 10B, WLAN 118 forwards data to the target (H)eNB 710. In an example embodiment, source WLAN 118 forwards via the X2' interface downlink data to target (H)eNB 710 for all data bearers which are being established in the target (H)eNB 710 during the HO REQUEST message processing.

As shown in FIG. 10B, target (H)eNB 710 buffers the data packets that are received from WLAN 118.

At step 16 of FIG. 10B, UE 116 may disassociate with the WLAN 118. In an example embodiment, after receiving the RRCConnectionReconfiguration message (including the mobilityControlInformation) passed by WRRC at step 13, UE 116 may perform a Disassociation with the source WLAN 118 to release the link with source WLAN 118. As shown in FIG. 10B, the communications may be performed using at least a MAC portion of the protocol stack.

At step 17 of FIG. 10B, UE 116 synchronizes with target (H)eNB 710. In an example embodiment, UE 116 performs synchronization with target (H)eNB 710 and accesses the target cell via RACH. UE 116 also derives target (H)eNB specific keys and configures the selected security algorithms to be used in the target cell. As shown in FIG. 10B, the communications may be performed using at least the PHY and MAC portion of the protocol stack.

At step 18 of FIG. 10B, the target (H)eNB 710 responds to the synchronization. In an example embodiment, (H)eNB 710 responds to the UE 116 with UL allocation and timing advance. As shown in FIG. 10, the communications may be performed using at least the RRC of the protocol stack.

At step 19 of FIG. 10B, UE 116 confirms the handover. In an example embodiment, UE 116 generates and transmits a RRCConnectionReconfigurationComplete message (C-RNTI) to confirm the handover to the target (H)eNB 710 to indicate that the handover procedure is completed for the UE 116. The target (H)eNB 710 verifies the C-RNTI sent in the RRCConnectionReconfigurationComplete message and then may start to send data to the UE 116. As shown in FIG. 10B, the communications may be performed using at least the RRC of the protocol stack.

At step 20 of FIG. 10C, (H)eNB 710 communicates a request to switch communication paths. In an example embodiment, target (H)eNB 710 generates and transmits a PATH SWITCH message to MME 112 indicating that the UE 116 has changed cell. As shown in FIG. 10C, the communication may be routed over the S1-AP interface.

At step 21 of FIG. 10C, MME 112 requests modification of the bearer. In an example embodiment, MME 112 generates and transmits a MODIFY BEARER REQUEST message to the Serving Gateway 114. As shown in FIG. 10C, the request may be transmitted over the S11 interface using the GTP protocol.

At step 22 of FIG. 10C, SGW 114 communicates a modification request to the PGW. In an example embodiment, SGW 114 generates and transmits a MODIFY BEARER REQUEST message to the PGW 108. As noted in FIG. 10C, the request may be transmitted via the S5 interface using the GTP protocol.

At step 23 of FIG. 10C, PGW 108 switches the communication path to the target (H)eNB 710. In an example embodiment, PGW 108 switches the downlink data path to the target (H)eNB 710. For example, PGW 108 may create a new GTP tunnel at S5 interface. PGW 108 may also generate and transmit one or more "End Marker" packets on the old path to the source WLAN 118 and then release any U-plane/TNL resources towards the source WLAN 118. For example, the PGW 108 may release the GTP tunnel on the S2a interface toward the WLAN 118.

At step 24 of FIG. 10C, PGW 108 transmits a response to the SGW 114. In an example embodiment, PGW 108 generates and transmits a MODIFY BEARER RESPONSE message to SGW 114. As noted in FIG. 10C, the response may be transmitted via S5 interface using the GTP protocol.

At step 25 of FIG. 10C, SGW 114 switches the communication path. In an example embodiment, SGW 114 switches the downlink data path. For example, SGW 114 may establish a new GTP tunnel at the S1 interface. As shown in FIG. 10C, after the switch is made data packets may be exchanged between the target (H)ENB 710 and the PGW 108 via the S1 and S5 interfaces using the GTP protocol. Accordingly, a communication path is established between the UE 116 and (H)eNB 710 via the Uu interface, between the (H)eNB 710 and SGW 114 via the S1-U interface, and between the SGW 114 and PGW 108 via the S5 interface.

At step 26 of FIG. 10C, SGW 114 transmits a response to the modify bearer request. In an example embodiment, SGW 114 generates and sends a MODIFY BEARER RESPONSE message to MME 112. As noted in FIG. 10C, the response is transmitted via the S11 interface using the GTP protocol.

At step 27 of FIG. 10C, MME 112 acknowledges the path switch. In an example embodiment, MME 112 confirms the PATH SWITCH message by generating and transmitting a PATH SWITCH ACKNOWLEDGE message to target (H)eNB 710. As noted in FIG. 10C, the communication may be made via the S1-AP interface.

At step 28 of FIG. 10C, (H)eNB 710 communicates an instruction to WLAN 118 to release its resources. In an example embodiment, after the PATH SWITCH ACKNOWLEDGE message is received from the MME 112, the target (H)eNB 710 generates and transmits information of the successful handover to source WLAN 118. In an example embodiment, (H)eNB 710 generates and transmits a UE CONTEXT RELEASE message which triggers the release of resources by the source WLAN 118.

At step 29 of FIG. 10C, WLAN 118 releases resources associated with its communication with UE 116. In an example embodiment, in response to the UE CONTEXT RELEASE message, WLAN 118 releases radio and C-plane related resources associated with UE 116. Any ongoing data forwarding may continue.

Accordingly, a handover of communication between a UE and the EPC may be handed over from a TWAN to an (H)eNB using an X2' interface that provides for direct communications between the TWAN and (H)eNB. It will be appreciated that in addition to the extended X2' interface, various other enhancements to the interfaces that are employed in the handover may be made in support of handover processing. For example, the following, which may be employed in the processing of FIGS. 10A-C, may represent enhancements to existing interfaces and protocols: WRRC Measure Control at step 1; Detect & measure signals from (H)eNB/WiFi AP at step 2; WRRC Measurement Report at step 3; HO decision at step 4; WRRC HO Request (to (H)eNB) at step 5; X2'-AP X2' Setup Request at step 6; X2'-AP X2' Setup Response at step 7; X2'-AP Resource Status Request at step 8; X2'-AP Resource Status Response at step 9; X2'-AP HO Request at step 10; X2'AP HO Request Acknowledgment (ACK) at step 12; WRRC RRC Connect Reconfig. at step 13; X2'-AP SN Status Transfer at step 14; X2'-U (GTP) Data Forwarding at step 15; MAC Disassociate with WLAN at step 16; GTP (S5) Modify Bearer Req. at step 22; GTP (S2a) End Marker at step 23 Switch Path; GTP (S5) Modify Bearer Res at step 24; Switch path at step 25; X2'-AP UE Connect Release at step 28; and Release Resources at step 29. These enhancements may represent enhancements to the message content and/or represent a new/modified action.

Handover from WLAN to (H)eNB Using X2' Interface

Figure 11A:
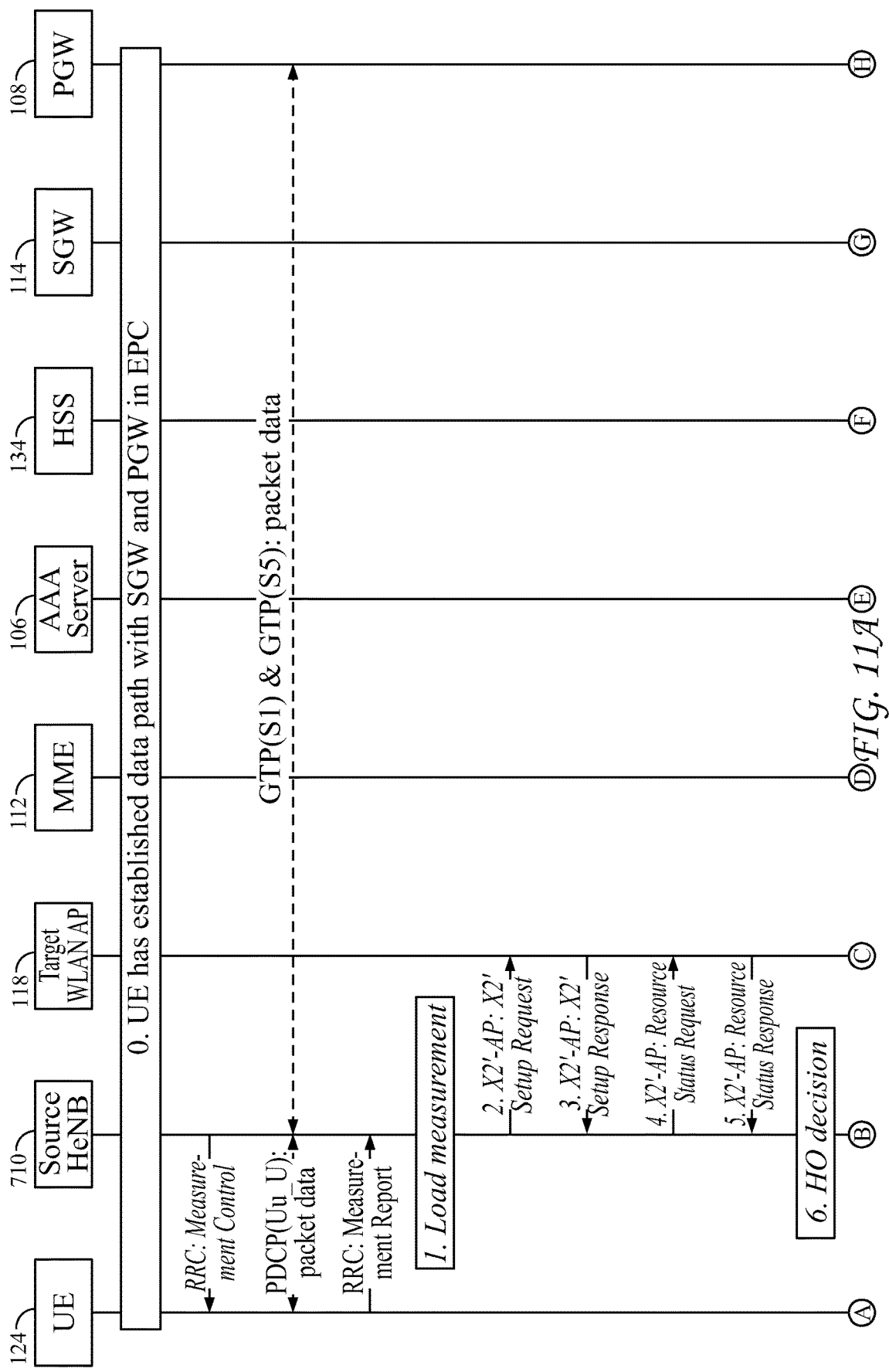
Figure 11C:
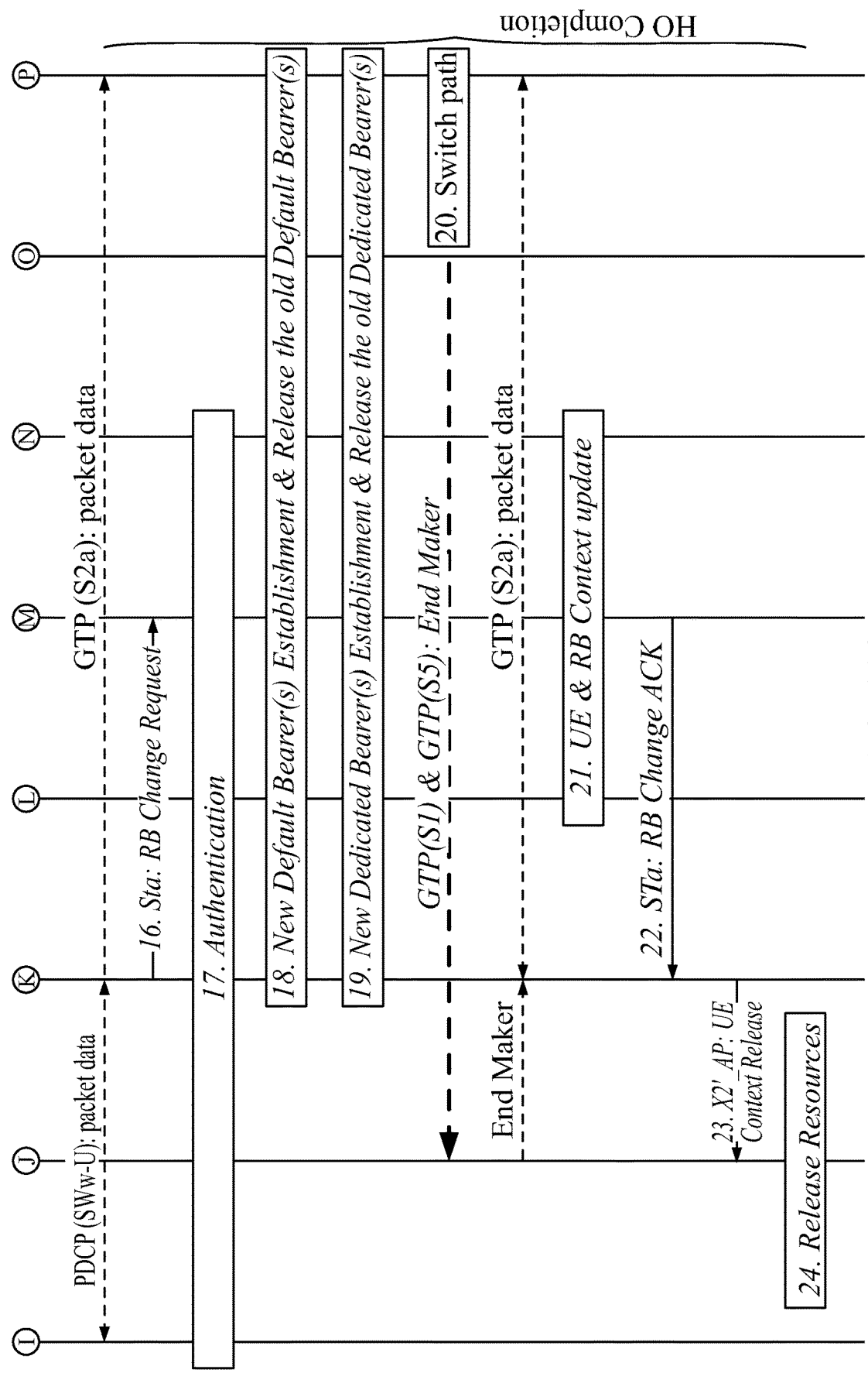

A handover of communications from an (H)eNB to a WLAN in connection with load balancing was previously discussed in connection with FIG. 6. As described in connection with FIG. 6, if a UE is under both (H)eNB and WLAN coverage, the (H)eNB may initiate an offload by directing the UE to handover from the (H)eNB to the WLAN when the (H)eNB is overloaded. FIGS. 11A-C depict a diagram illustrating various example processing steps in performing a handover from an (H)eNB to a WLAN.

Referring to FIG. 11A, at step 0 various preliminary activities are addressed. For example, UE 124 may have established bearer(s)/tunnels for data in EPC 104. Data packets may be transferred from/to the UE 124 and to/from the EPC 104 via (H)eNB 604.

As shown in FIG. 11A, (H)eNB 710 may perform detection measurement control. In an example embodiment, source (H)eNB 710 configures the UE neighbor (H)eNB/ WLAN AP detection and measurement procedures with parameter values and thresholds according to area restriction information. In an example scenario, (H)eNB 710 may use the RRC protocol to communicate the parameter values and threshold to UE 124.

UE 124 may generate and transmit a measurement report consistent with the configuration. In an example embodiment, UE 124 may generate and transmit a MEASUREMENT REPORT message with detection and measurement information consistent with established rules set by for example, system information, specification etc., as well as the configuration parameters sent by a source (H)eNB. In an example scenario, UE 124 may communicate with (H)eNB 710 using the RRC protocol.

At step 1 of FIG. 11A, (H)eNB performs a load measurement operation. In an example embodiment, source (H)eNB 710 performs Load Measurement on itself to determine the processing load on the (H)eNB 710.

At step 2 of FIG. 11A, (H)eNB 710 sets up the X2' interface for use. In an example embodiment, based on the MEASUREMENT REPORT received from UE 124 and the Load Measurements as the source (H)eNB 710, as well as the UE Context information, source (H)eNB 710 identifies to offload the traffic related to the particular UE, i.e., UE 124, to the target WLAN 118 that also covers the UE area. Source (H)eNB 710 generates and transmits using the X2' interface an X2' SETUP REQUEST message to the target WLAN 118 if there is no X2' session existing between source (H)eNB 710 and target WLAN 118.

At step 3 of FIG. 11A, WLAN 118 transmits a response to (H)eNB 710. In an example embodiment, target WLAN 118 generates and transmits an X2' SETUP RESPONSE message using the X2' interface to confirm the success of X2' setup between source (H)eNB 710 and target WLAN 118.

At step 4 of FIG. 11A, (H)eNB 710 requests information regarding the load on WLAN 118. In an example embodiment, source (H)eNB 710 generates and transmits an X2' RESOURCE STATUS REQUEST to the target WLAN 118 for load information. The request is transmitted via the X2' interface.

At step 5 of FIG. 11A, WLAN 118 responds to the request. In an example embodiment, target WLAN 118 generates and transmits X2' RESOURCE STATUS RESPONSE message with load measurements to source (H)eNB 710. The response comprises information specifying the processing load and capabilities of the WLAN 118. The response is transmitted via the X2' interface.

At step 6 of FIG. 11A, (H)eNB 710 based on the received data identifies whether or not to perform a handover. In an example embodiment, source (H)eNB 710 makes a handover decision based on target WLAN's X2' RESOURCE STATUS RESPONSE message as well as load information for the (H)eNB 710 itself. For example, if the processing load on the WLAN 118 is relatively small, and the processing load on (H)eNB 710 is relatively high, (H)eNB may identify to perform a handover.

At step 7 of FIG. 11B, (H)eNB 710 transmits a request to perform a handover. In an example embodiment, source (H)eNB 710 generates and transmits a HANDOVER REQUEST message to the target WLAN 118. The message indicates a request to proceed with the handover operation and may comprise any information needed for the handover including, for example, UE Context—security context and radio bearer (RB) context as well as the target WLAN information. The request and the information included in the request is based at least in part on the received RESOURCE STATUS RESPONSE from the target WLAN 118.

At step 8 of FIG. 11B, WLAN 118 performs configuration in support of the handover. In an example embodiment, target WLAN 118 performs HO Admission Control based on the received UE Context and RB Context as well as the RB QoS information to increase the likelihood of a successful HO. The target WLAN 118 configures the required resources according to the received HO information.

At step 9 of FIG. 11B, WLAN 118 transmits an acknowledgement of the handover request. In an example embodiment, target WLAN 118 prepares for the handover by generating and transmitting a HANDOVER REQUEST ACKNOWLEDGE to the source (H)eNB 710. The HANDOVER REQUEST ACKNOWLEDGE message may include a transparent container to be sent to the UE 124 as a WRRC message to perform the handover.

At step 10 of FIG. 11B, (H)eNB 710 commands UE 124 to perform the handover. In an example embodiment, source (H)eNB 710 commands the UE 124 to perform the handover by generating and transmitting a WRRCConnectionReconfiguration message along with necessary parameters such as, for example, new WLAN AP ID, target WLAN AP security algorithm identifiers, etc. The information may further comprise RNL/TNL information for the forwarding tunnels, if necessary. As shown in FIG. 11B, the command and information are transmitted using the WRRC protocol.

At step 11 of FIG. 11B, (H)eNB 710 conveys information needed for performing the handover. In an example embodiment, source (H)eNB 710 sends the SN STATUS TRANSFER message to the target WLAN 118 to convey the uplink and downlink PDCP sequence number (SN) and hyper frame number (HFN) of radio bearer (RBs). As shown in FIG. 11B, the information is communicated using the X2' interface.

At step 12 of FIG. 11B, (H)eNB 710 forwards downlink data to target WLAN 118. In an example embodiment, source (H)eNB 710 forwards downlink data to target WLAN 118 for all data bearers which are being established in the target WLAN 118 during the HO REQUEST message processing. The data is forwarded using the X2' interface.

At step 13 of FIG. 11B, UE 124 synchronizes with WLAN 118. In an example embodiment, after receiving the WRRCConnectionReconfiguration message including the mobilityControlInformation, UE 124 performs synchronization with the target WLAN 118. For example, UE 124 may generate and transmit ASSOCIATION REQUEST message to the target WLAN 118.

At step 14 of FIG. 11B, WLAN 118 transmits a response to the request to associate. In an example embodiment, target WLAN 118 generates and transmits a response to the UE 124. In an example embodiment, the response may comprise UL allocation and timing information in an ASSOCIATION RESPONSE message.

At step 15 of FIG. 11B, UE 124 communicates a confirmation of the association to the WLAN 118. In an example embodiment, UE 124 generates and transmits an ASSOCIATION CONFIRM message to confirm the handover to the target WLAN 118. The message indicates that the handover procedure is completed for the UE 124 and that the target WLAN 118 may start to send data to the UE 124.

As shown in FIG. 11C, after step 15 data may be exchanged between UE 124 and WLAN 118 over the SWw-U protocol layer using the PDCP protocol. Further, data may be exchanged between WLAN 118 and PGW 108 over the S2a interface using the GTP protocol.

At step 16 of FIG. 11C, WLAN 118 generates and transmits an RB CHANGE REQUEST message to AAA Server 106 via interface STa to request accessing path to EPC 104 via WLAN 118.

At step 17 of FIG. 11C, authentication of the various devices is performed. In an example embodiment, authentication procedures are conducted among UE 124, AAA Server 712, and HSS 134.

At step 18 of FIG. 11C, new default bearer(s) are established for handling the new communications. In an example embodiment, new default bearers are established between WLAN 118 and PGW 108. For example bearers for a GTP tunnel via S2a interface may be established. The old default bearers are released.

At step 19, of FIG. 11C, new dedicated bearer(s) are established for handling the communications. In an example embodiment, new dedicated bearers are established between WLAN 118 and PGW 108. For example bearers for a GTP tunnel via S2a interface may be established. The old dedicated bearers are released.

At step 20 of FIG. 11C, PGW 108 switches communication paths. In an example embodiment, PGW 108 switches to the new path, i.e. new GTP tunnel, and sends "End Marker to source (H)eNB 710 on the old path and then can release any U-plane/TNL resources towards the source (H)eNB 710.

At step 21 of FIG. 11C, system components are updated with the new connection information. In an example embodiment, UE Context and well as the RB connection information are updated among AAA Server 106, HSS 134, and MME 112.

At step 22 of FIG. 11, AAA server 106 confirms the change request of step 16. In an example embodiment, AAA server 106 confirms the RB Change Request with the RB CHANGE ACKNOWLEDGE message to target WLAN 118 via interface Sta.

At step 23 of FIG. 11C, WLAN 118 communicates instructions to release to (H)eNB 710. In an example embodiment, after the RB CHANGE ACKNOWLEDGE message is received from the AAA server 106, the target WLAN 118 informs success of a handover to source (H)eNB 710 by UE CONTEXT RELEASE message which triggers the release of resources by the source (H)eNB 710.

At step 24 of FIG. 11C, (H)eNB 710 releases resources. In an example embodiment, source (H)eNB 710 releases radio and C-plane related resources associated with UE 124 upon reception of the UE CONTEXT RELEASE message. Any ongoing data forwarding may continue.

Accordingly, a handover of communication between a UE and the EPC may be handed over from an (H)eNB to WLAN using an X2' interface that provides for direct communications between the (H)eNB and TWAN. It will be appreciated that in addition to the extended X2' interface, various other enhancements to the interfaces that are employed in the handover may be made in support of handover processing. For example, the following, which may be employed in the processing of FIGS. 11A-C, may represent enhancements to existing interfaces and protocols: RRC Measure Control between Source (H)eNB and UE, Load measurement at step 1; X2'-AP X2' Setup Request at step 2; X2'-AP X2' Setup Response at step 3; X2'-AP Resource Status Request at step 4; X2'-AP Resource Status Response at step 5; HO decision at step 6; X2'-AP HO Request at step 7; X2'AP HO Request ACK at step 9; WRRC RRC Conn. Reconfig. at step 10; X2'-AP SN Status Transfer at step 11; X2'-U (GTP) Data Forwarding at step 12; Synchronization & Association Req. to WLAN at step 13; Association Response at step 14; Association Confirmation at step 15; at STa interface RB Change Request to AAA server at step 16; Authentication at step 17; New Default Bearer(s) Establishment & Release the old Default Bearer(s) at step 18; New Dedicated Bearer(s) Establishment & Release the old Default Bearer(s) at step 19; GTP (51) and GTP (S5) End Maker at step 20 Switch path; UE & RB Context update at step 21; at STa interface RB Change ACK at step 22; X2' AP UE Context Release at step 23; and Release Resources at step 24. These enhancements may represent enhancements to the message content and/or represent a new/modified action.

X2' Signaling Messages for Handover

According to an aspect of the disclosed embodiments, the X2'-AP signaling messages for handover processing as described herein involve enhanced X2-AP messages which are described in 3GPP TS 36.423, the contents of which are hereby incorporated herein by reference. The X2'-AP signaling messages have been enhanced with Information Elements (IE) relative to the X2-AP messages. Discussed below are several of the messages that have been enhanced and which may be used to perform a handover procedure using the X2' interface as described above.

Handover Request

In an example embodiment, a HANDOVER REQUEST message may be sent by the source (H)eNB/WLAN to the target WLAN/(H)eNB to request the preparation of resources for a handover. According to an aspect of an example embodiment, an information element "Handover History" may be inserted in the handover request and may be used for avoiding Ping-Pong handovers. When a target (H)eNB/WLAN processes a handover request, it may reject the request if the time stamps in the "Handover History" show very frequent handovers in the past. The following chart illustrates the format of the Handover Request message with modifications to the information elements relative to the existing format identified using underlining.

| IE/Group Name | Presence | Range/Value | IE type | Semantics Description |
| --- | --- | --- | --- | --- |
| Message Type | M | | | |
| Old <u>(H)eNB/WLAN</u> UE X2AP ID | M | | (H)eNB/<br><u>WLAN</u> UE<br>X2AP ID | Allocated at the source<br>(H)eNB/WLAN |
| >Type | <u>O</u> | | (H)eNB or<br><u>WLAN</u> | |
| Cause | M | | | |
| Target <u>(H)eNB/WLAN</u> ID | M | | For (H)eNB:<br>ECGI (i.e.<br>PLMN ID +<br>EUTRAN Cell<br>ID)<br><u>For WLAN:</u><br><u>WLAN SSID +</u><br><u>AP ID</u> | Allocated at the target<br>(H)eNB/<u>WLAN</u> |
| >Type | <u>M</u> | | (H)eNB or<br><u>WLAN</u> | |
| GUMMEI | M | | | |

| IE/Group Name | Presence | Range/Value | IE type | Semantics Description |
| --- | --- | --- | --- | --- |
| UE Context Information | | 1 | | |
| >MME UE S1AP ID | M | | INTEGER $(0..2^{32} - 1)$ | MME UE S1AP ID allocated at the MME |
| >UE Security Capabilities | M | | | |
| >AS Security Information | M | | | |
| >UE Aggregate Maximum Bit Rate | M | | | |
| >Subscriber Profile ID for RAT/Frequency priority | O | | | |
| >E-RABs To Be Setup List | | 1 | | |
| >>E-RABs To Be Setup Item | | 1 ... <maxnoofBearers> | | |
| >>>E-RAB ID | M | | | |
| >>>E-RAB Level QoS Parameters | M | | | Includes necessary QoS parameters |
| >>>DL Forwarding | O | | | |
| >>>UL GTP Tunnel Endpoint | M | | GTP Tunnel Endpoint | SGW endpoint of the S1 transport bearer. For delivery of UL PDUs. |
| >RRC Context | M | | OCTET STRING | Includes the RRC Handover Preparation Information message |
| >Handover Restriction List | O | | | |
| >Location Reporting Information | O | | | Includes the necessary parameters for location reporting |
| >Management Based MDT Allowed | O | | | |
| >Management Based MDT PLMN List | O | | MDT PLMN List | |
| UE History Information | M | | With "WLAN" added to the "Last Visited Cell List" and "Last Visited Cell Information" | |
| Trace Activation | O | | | |
| SRVCC Operation Possible | O | | | |
| CSG Membership Status | O | | | |
| Mobility Information | O | | BIT STRING (SIZE (32)) | Information related to the handover; the source (H)eNB/WLAN provides it in order to enable later analysis of the conditions that led to a wrong HO. |
| New IEs (to avoid Ping-Pong HOs) | | | | |
| > Handover History | | | | |
| >> HO1: ID | | | | |
| >>> time | | | | |
| >>> result | | | | |
| >> HO2: ID | | | | |
| >>> time | | | | |
| >>> result | | | | |

Handover Request Acknowledge

In an example embodiment, a HANDOVER REQUEST ACKNOWLEDGE message may be sent by the target WLAN/H(e)NB to inform the source H(e)NB/WLAN about the prepared resources at the target. The following chart illustrates the format of the Handover Request Acknowledge message with modifications to the information elements relative to the existing format identified using underlining.

| IE/Group Name | Presence | Range/Value | IE type | Semantics Description |
| --- | --- | --- | --- | --- |
| Message Type | M | | | |
| Old (H)eNB/WLAN UE X2AP ID | M | | (H)eNB/WLAN UE X2AP ID | Allocated at the source (H)eNB/WLAN |
| > Type | O | | | |
| New (H)eNB/WLAN UE X2AP ID | M | | (H)eNB/WLAN UE X2AP ID | Allocated at the target (H)eNB/WLAN |

| IE/Group Name | Presence | Range/Value | IE type | Semantics Description |
|---|---|---|---|---|
| > Type | O | (H)eNB or WLAN | | |
| E-RABs Admitted List | | 1 | | |
| > E-RABs Admitted Item | | 1 ... <maxnoofBearers> | | |
| >>E-RAB ID | M | | | |
| >>UL GTP Tunnel Endpoint | O | | GTP Tunnel Endpoint | Identifies the X2 transport bearer used for forwarding of UL PDUs |
| >>DL GTP Tunnel Endpoint | O | | GTP Tunnel Endpoint | Identifies the X2 transport bearer. used for forwarding of DL PDUs |
| E-RABs Not Admitted List | O | | E-RAB List | A value for E-RAB ID shall only be present once in E-RABs Admitted List IE and in E-RABs Not Admitted List IE. |
| Target (H)eNB/WLAN To Source (H)eNB/WLAN Transparent Container | M | | OCTET STRING (including WRRC message for WLAN AP HO command) | Includes the RRC/WRRC E-UTRA/WLAN AP Handover Command message. |
| Criticality Diagnostics | O | | | |

SN Status Transfer

In an example embodiment, SN STATUS TRANSFER message is sent by the source (H)eNB/WLAN to the target WLAN/(H)eNB to transfer the uplink/downlink PDCP SN and HFN status during a handover. The following chart illustrates the format of the SN Status Transfer message with modifications to the information elements relative to the existing format identified using underlining.

| IE/Group Name | Presence | Range/Value | IE type and reference | Semantics Description |
|---|---|---|---|---|
| Message Type | M | | | |
| Old (H)eNB/WLAN UE X2AP ID | M | | (H)eNB/ WLAN UE X2AP ID | Allocated at the source (H)eNB/ WLAN |
| > Type | O | (H)eNB or WLAN | | |
| New (H)eNB/WLAN UE X2AP ID | M | | (H)eNB/ WLAN UE X2AP ID | Allocated at the target (H)eNB/ WLAN |
| > Type | O | (H)eNB or WLAN | | |
| E-RABs Subject To Status Transfer List | | 1 | | |
| >E-RABs Subject To Status Transfer Item | | 1 ... <maxnoofBearers> | | |
| >>E-RAB ID | M | | | |
| >>Receive Status Of UL PDCP SDUs | O | | BIT STRING (4096) | PDCP Sequence Number = (First Missing SDU Number + bit position) modulo 4096<br>0: PDCP SDU has not been received.<br>1: PDCP SDU has been received correctly. |
| >>UL COUNT Value | M | | COUNT Value | PDCP-SN and Hyper Frame Number of the first missing UL SDU in case of 12 bit long PDCP-SN |
| >>DL COUNT Value | M | | COUNT Value | PDCP-SN and Hyper frame number that the target (H)eNB/WLAN AP should assign for the next DL SDU not having an SN yet in case of 12 bit long PDCP-SN |

| IE/Group Name | Presence | Range/Value | IE type and reference | Semantics Description |
|---|---|---|---|---|
| >>Receive Status Of UL PDCP SDUs Extended | O | | BIT STRING (1 ... 16384) | The IE is used in case of 15 bit long PDCP-SN in this release. The first bit indicates the status of the SDU after the First Missing UL PDCP SDU. The $N^{th}$ bit indicates the status of the UL PDCP SDU in position (N + First Missing SDU Number) modulo (1 + the maximum value of the PDCP-SN). 0: PDCP SDU has not been received. 1: PDCP SDU has been received correctly. |
| >>UL COUNT Value Extended | O | | COUNT Value | PDCP-SN and Hyper Frame Number of the first missing UL SDU in case of 15 bit long PDCP-SN |
| >>DL COUNT Value Extended | O | | COUNT Value | PDCP-SN and Hyper Frame Number that the target (H)eNB/WLAN AP should assign for the next DL SDU not having an SN yet in case of 15 bit long PDCP-SN |

UE Context Release

In an example embodiment, UE CONTEXT RELEASE message is sent by the source (H)eNB/WLAN to the target WLAN/(H)eNB to indicate that resources can be released. The following chart illustrates the format of the UE Context Release message with modifications to the information elements relative to the existing format identified using underlining.

| IE/Group Name | Presence | Range/Value | IE type and reference | Semantics description |
|---|---|---|---|---|
| Message Type | M | | | |
| Old (H)eNB/WLAN UE X2AP ID | M | | (H)eNB/ WLAN UE X2AP ID | Allocated at the source (H)eNB/ WLAN |
| > Type | O | (H)eNB or WLAN | | |
| New HeNB/WLAN UE X2AP ID | M | | (H)eNB/ WLAN UE X2AP ID | Allocated at the target (H)eNB/ WLAN |
| > Type | O | (H)eNB or WLAN | | |

Handover Cancel

In an example embodiment, HANDOVER CANCEL message is sent by the source (H)eNB/WLAN to the target WLAN/(H)eNB to cancel an ongoing handover. The following chart illustrates the format of the Handover Cancel message with modifications to the information elements relative to the existing format identified using underlining.

| IE/Group Name | Presence | Range/Value | IE type and reference | Semantics description |
|---|---|---|---|---|
| Message Type | M | | | |
| Old (H)eNB/WLAN UE X2AP ID | M | | (H)eNB/ WLAN UE X2AP ID | Allocated at the source (H)eNB/ WLAN |

| IE/Group Name | Presence | Range/Value | IE type and reference | Semantics description |
|---|---|---|---|---|
| > Type | O | (H)eNB or WLAN | | |
| New <u>(H)eNB/WLAN</u> UE X2AP ID | O | | (H)eNB/<br><u>WLAN</u> UE<br>X2AP ID | Allocated at the target (H)eNB/<br><u>WLAN</u> |
| > Type | O | (H)eNB or WLAN | | |
| Cause | M | | | |

Load Information

In an example embodiment, LOAD INFORMATION message is sent by the source (H)eNB/WLAN to the target WLAN/(H)eNB to load and interference coordination information. The following chart illustrates the format of the Load Information message with modifications to the information elements relative to the existing format identified using underlining.

| IE/Group Name | Presence | Range/Value | IE type and reference | Semantics description |
|---|---|---|---|---|
| Message Type | M | | | |
| Cell/WLAN Information | M | | | |
| >Cell/<u>WLAN AP</u> Information Item | | 1 ... <maxCellineNB/<u>maxWLANAPlineNB</u>> | | |
| >> (H)eNB Cell/<u>WLAN</u> ID | M | | For (H)eNB:<br><u>ECGI (i.e.</u><br><u>PLMN ID +</u><br><u>EUTRAN</u><br><u>Cell ID)</u><br><u>For WLAN:</u><br><u>WLAN SSID +</u><br><u>AP ID</u> | Id of the source cell |
| >>> Type | M | (H)eNB or WLAN | | |
| >><u>UL Interference Overload Indication</u> | O | | | |
| >>UL High Interference Information | | 0 ... <maxCellineNB/<u>maxWLANAPlineNB</u>> | | "maxCellineNB" for (H)eNB and "maxWLANAPlineNB" for WLAN |
| >>>Target <u>(H)eNB/</u><u>WLAN</u> Cell ID | M | | For (H)eNB:<br><u>ECGI (i.e.</u><br><u>PLMN ID +</u><br><u>EUTRAN</u><br><u>Cell ID)</u><br><u>For WLAN:</u><br><u>WLAN SSID +</u><br><u>AP ID</u> | Id of the cell for which the HII is meant |
| >>>> Type | M | (H)eNB or WLAN | | |
| >>> UL High Interference Indication | M | | | |
| >>Relative Narrowband Tx Power (RNTP) | O | | | |
| >>ABS Information | O | | | |
| >>Invoke Indication | O | | | |

Error Indication

In an example embodiment, ERROR INDICATION message is sent by the source (H)eNB/WLAN to the target WLAN/(H)eNB to indicate that some error has been detected in the H(e)NB/WLAN. The following chart illustrates the format of the Error Indication message with modifications to the information elements relative to the existing format identified using underlining.

| IE/Group Name | Presence | Range/Value | IE type and reference | Semantics description |
|---|---|---|---|---|
| Message Type | M | | | |
| Old <u>(H)eNB/WLAN</u> UE X2AP ID | M | | (H)eNB/<br><u>WLAN</u> UE<br>X2AP ID | Allocated at the source (H)eNB/WLAN |

-continued

| IE/Group Name | Presence | Range/Value | IE type and reference | Semantics description |
|---|---|---|---|---|
| >Type | O | (H)eNB or WLAN | | |
| New (H)eNB/WLAN UE X2AP ID | M | | (H)eNB/ WLAN UE X2AP ID | Allocated at the target (H)eNB/WLAN |
| >Type | O | (H)eNB or WLAN | | |
| Cause | O | | | |
| Criticality Diagnostics | O | | | |

X2 Setup Request

In an another example embodiment, X2 SETUP REQUEST message is sent by the source (H)eNB/WLAN to a neighboring WLAN/(H)eNB to transfer the initialization information for a TNL association. The following chart illustrates the format of the Setup Request message with modifications to the information elements relative to the existing format identified using underlining.

| IE/Group Name | Presence | Range/Value | IE type and reference | Semantics description |
|---|---|---|---|---|
| Message Type | M | | | |
| Global (H)eNB/WLAN ID | M | | | |
| Served Cells/WLAN APs | | 1 ... <maxCellineNB/ maxWLANAPlineNB> | | Complete list of cells/WLAN APs served by the H(e)NB/WLAN |
| >Served Cell/WLAN AP Information | M | | | |
| >Neighbour Information | | 0 ... <maxnoofNeighbours> | | |
| >>ECGI or | M | | (H)eNB: ECGI WLAN: WLAN SSID + AP ID | E-UTRAN Cell/WLAN Global Identifier of the neighbour cell/WLAN AP |
| >> WLAN SSID + APID | | | | |
| >>> Type | M | (H)eNB or WLAN | | |
| >>PCI/PWI | M | | INTEGER (0 ... 503, ... ) | Physical Cell/WLAN AP Identifier of the neighbour cell/WLAN AP |
| >>> Type | M | (H)eNB or WLAN | | |
| >>EARFCN/WARFCN | M | | | (H)eNB: DL EARFCN for FDD or EARFCN for TDD WLAN: absolution radio frequency channel number |
| >>> Type | M | (H)eNB or WLAN | | |
| >>TAC | O | | OCTET STRING (2) | Tracking Area Code |
| >>EARFCN/WARFCN Extension | O | | | DL EARFCN/WARFCN for FDD or EARFCN/WARFCN for TDD. If this IE is present, the value signalled in the EARFCN IE is ignored. |
| >>> Type | M | (H)eNB or WLAN | | |
| GU Group Id List | | 0 ... <maxfPools> | | List of all the pools to which the (H)eNB/WLAN AP belongs |
| >GU Group Id | M | | | |
| >> Type | M | (H)eNB or WLAN | | |

X2 Setup Response

In an example embodiment, X2 SETUP RESPONSE message is sent by the source (H)eNB/WLAN to a neighboring WLAN/(H)eNB to transfer the initialization information for a TNL association. The following chart illustrates the format of the Setup Response message with modifications to the information elements relative to the existing format identified using underlining.

| IE/Group Name | Presence | Range | IE type and reference | Semantics description |
|---|---|---|---|---|
| Message Type | M | | | |
| Global (H)eNB/WLANID | M | | | |
| Served Cells/WLAN APs | | 1 . . . <maxCellineNB/ maxWLANAPlineNB> | | Complete list of cells served by the H(e)NB/WLAN |
| >Served Cell/WLAN AP Information | M | | | |
| >Neighbour Information | | 0 . . . <maxnoofNeighbours> | | |
| >>ECGI or >> WLAN SSID + APID | M | | (H)eNB: ECGI WLAN: WLAN SSID + AP ID | E-UTRAN Cell/WLAN Global Identifier of the neighbour cell/ WLAN AP |
| >>> Type | M | (H)eNB or WLAN | | |
| >>PCI/PWI | M | | INTEGER (0 . . . 503, . . . ) | Physical Cell/WLANIdentifier of the neighbour cell/WLAN AP |
| >>> Type | M | (H)eNB or WLAN | | |
| >>EARFCN/WARFCN | M | | | (H)eNB: DL EARFCN for FDD or EARFCN for TDD WLAN AP: absolution radio frequency channel number |
| >>> Type | M | (H)eNB or WLAN | | |
| >>TAC | O | | OCTET STRING (2) | Tracking Area Code |
| >>EARFCN/WARFCN Extension | O | | | DL EARFCN/WARFCN for FDD or EARFCN/WARFCN for TDD. If this IE is present, the value signalled in the EARFCN IE is ignored. |
| >>> Type | M | (H)eNB or WLAN | | |
| GU Group Id List | | 0 . . . <maxPools> | | List of all the pools to which the eNB belongs |
| >GU Group Id | M | | | |
| >> Type | M | (H)eNB or WLAN | | |
| Criticality Diagnostics | O | | | |

Resource Status Request

In an example embodiment, RESOURCE STATUS REQUEST message is sent by an (H)eNB/WLAN to neighboring (H)eNB/WLAN to initiate the requested measurement according to the parameters given in the message. The following chart illustrates the format of the Resource Status Request message with modifications to the information elements relative to the existing format identified using underlining.

| IE/Group Name | Presence | Range/Value | IE type and reference | Semantics description |
|---|---|---|---|---|
| Message Type | M | | | |
| (H)eNB1/WLAN AP1 Measurement ID | M | | INTEGER (1 . . . 4095, . . . ) | Allocated by H(e)NB/WLAN |
| > Type | M | (H)eNB or WLAN | | |
| (H)eNB2/WLAN AP2 Measurement ID | C- ifRegistrationRequestStop | | INTEGER (1 . . . 4095, . . . ) | Allocated by H(e)NB/WLAN |
| > Type | M | (H)eNB or WLAN | | |
| Registration Request | M | | ENUMERATED(start, stop, . . . ) | A value set to "stop", indicates a request to stop all cells/WLAN AP measurements. |

| IE/Group Name | Presence | Range/Value | IE type and reference | Semantics description |
|---|---|---|---|---|
| Report Characteristics | O | | BITSTRING (SIZE(32)) | Each position in the bitmap indicates measurement object the target (H)eNB/WLAN AP is requested to report.<br>First Bit = PRB Periodic,<br>Second Bit = TNL load Ind Periodic,<br>Third Bit = HW Load Ind Periodic,<br>Fourth Bit = Composite Available Capacity Periodic,<br>Fifth Bit = ABS Status Periodic.<br>Other bits shall be ignored by the target (H)eNB/WLAN AP. |
| Cell/WLAN AP To Report | | 1 | | Cell/WLAN AP ID list for which measurement is needed |
| >Cell/WLAN AP To Report Item | | 1 ... <maxCellineNB/ maxWLANPlineNB > | | |
| >> Cell/WLAN AP ID | M | | (H)eNB: ECGI<br>WLAN: WLAN SSID + AP ID | |
| >>> Type | M | | (H)eNB or WLAN | |
| Reporting Periodicity | O | | ENUMERATED(1000 ms, 2000 ms, 5000 ms, 10000 ms, ... ) | |
| Partial Success Indicator | O | | ENUMERATED(partial success allowed, ... ) | Included if partial success is allowed |

Resource Status Response

In another example embodiment, RESOURCE STATUS RESPONSE message is sent by the eNB to indicate that the requested measurement, for all or for a subset of the measurement objects included in the measurement is successfully initiated. The following chart illustrates the format of the Resource Status Response message with modifications to the information elements relative to the existing format identified using underlining.

| IE/Group Name | Presence | Range/Value | IE type and reference | Semantics description |
|---|---|---|---|---|
| Message Type | M | | | |
| (H)eNB1/WLAN AP1 Measurement ID | M | | INTEGER (1 ... 4095, ... ) | Allocated by H(e)NB/WLAN |
| > Type | M | | (H)eNB or WLAN | |
| (H)eNB1/WLAN AP2 Measurement ID | C-ifRegistrationRequestStop | | INTEGER (1 ... 4095, ... ) | Allocated by H(e)NB/WLAN |
| > Type | M | | (H)eNB or WLAN | |
| Criticality Diagnostics | O | | | |
| Measurement Initiation Result | | 0 ... 1 | | List of all cells/WLAN APs in which measurement objects were requested, included when indicating partial success |
| >Measurement Initiation Result Item | | 1 ... <maxCellineNB/ maxWLANAPlineNB > | | |
| >>Cell/WLAN AP ID | M | | (H)eNB: ECGI<br>WLAN: WLAN SSID + AP ID | |
| >>> Type | M | | (H)eNB or WLAN | |
| >>Measurement Failure Cause List | | 0 ... 1 | | Indicates that target (H)eNB/WLAN could not initiate the measurement for at least one of the requested measurement objects in the cell |
| >>>Measurement Failure Cause Item | | 1 ... <maxFailedMeasObjects> | | |
| >>>>Measurement Failed Report Characteristics | M | | BITSTRING (SIZE(32)) | Each position in the bitmap indicates measurement object that failed to be initiated in the |

| IE/Group Name | Presence | Range/Value | IE type and reference | Semantics description |
|---|---|---|---|---|
| | | | | target (H)eNB/WLAN. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Other bits shall be ignored by the source (H)eNB/WLAN. |
| >>>>Cause | M | | | Failure cause for measurement objects for which the measurement cannot be initiated |

Resource Status Failure

In an example embodiment, RESOURCE STATUS FAILURE message is sent by the eNB to indicate that for none of the requested measurement objects the measurement can be initiated. The following chart illustrates the format of the Resource Status Failure message with modifications to the information elements relative to the existing format identified using underlining.

| IE/Group Name | Presence | Range/Value | IE type and reference | Semantics description |
|---|---|---|---|---|
| Message Type | M | | | |
| (H)eNB1/WLAN AP1 Measurement ID | M | | INTEGER (1 . . . 4095, . . . ) | Allocated by H(e)NB/WLAN |
| > Type | M | (H)eNB or WLAN | | |
| (H)eNB1/WLAN AP2 Measurement ID | M | | INTEGER (1 . . . 4095, . . . ) | Allocated by H(e)NB/WLAN |
| > Type | M | (H)eNB or WLAN | | |
| Cause | M | | | Ignored by the receiver when the Complete Failure Cause Information IE is included |
| Criticality Diagnostics | O | | | |
| Complete Failure Cause Information | | 0 . . . 1 | | Complete list of failure causes for all requested cells |
| >Complete Failure Cause Information Item | | 1 . . . <maxCellineNB/ maxWLANAPlineNB> | | |
| >>Cell/WLAN AP ID | M | | (H)eNB: ECGI WLAN: WLAN SSID + AP ID | |
| >>> Type | M | (H)eNB or WLAN | | |
| >>Measurement Failure Cause List | | 1 | | |
| >>>Measurement Failure Cause Item | | 1 . . . <maxFailedMeasObjects> | | |
| >>>>Measurement Failed Report Characteristics | M | | BITSTRING (SIZE(32)) | Each position in the bitmap indicates measurement object that failed to be initiated in the target (H)eNB/WLAN. First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Other bits shall be ignored by the source (H)eNB/WLAN. |

-continued

| IE/Group Name | Presence | Range/Value | IE type and reference | Semantics description |
|---|---|---|---|---|
| >>>>Cause | M | | | Failure cause for measurements that cannot be initiated |

Example UE User Interface

Figure 12:
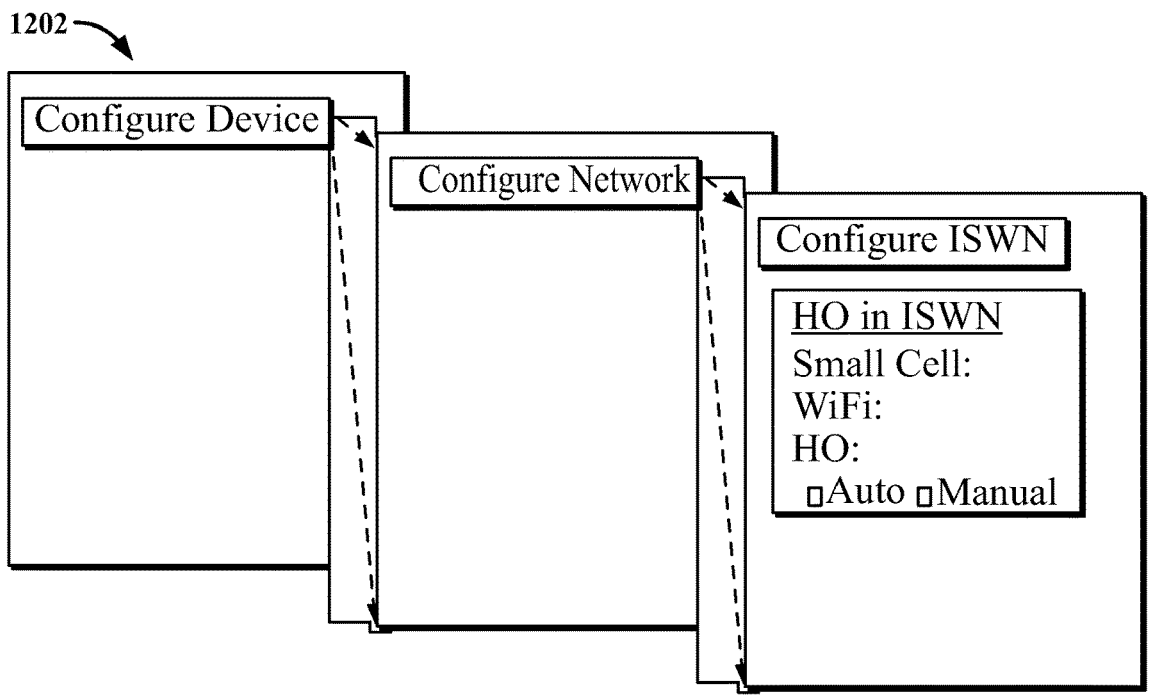
FIG. 12 is a block diagram illustrating a user interface for configuring handover in Integrated Small Cell and WiFi Networks (ISWN) in accordance with an example embodiment.

It will be appreciated that the devices and systems that implement handover operations using the X2' interface as described above may be configured to operate in a desired manner regarding handovers. For example, UE 116,124, WLAN 118, (H)eNB 710, and/or any other devices may be configured to indicate whether or not the particular device or system will perform handovers as described above. FIG. 12 depicts an example user interface that may be used for handover configuration or setup. As shown, the configuration may be performed at any appropriate level within the system—device, network, and ISWN. With respect to each, and as illustrated by user interface 1202, the user interface allows the user to specify whether the device, network, or ISWN is to perform handover operations automatically or manually. For example, the user interface may allow a user to select a particular ISWN containing particular (H)eNBs and WLAN and specify whether handovers should be performed automatically or manually.

Figure 13:
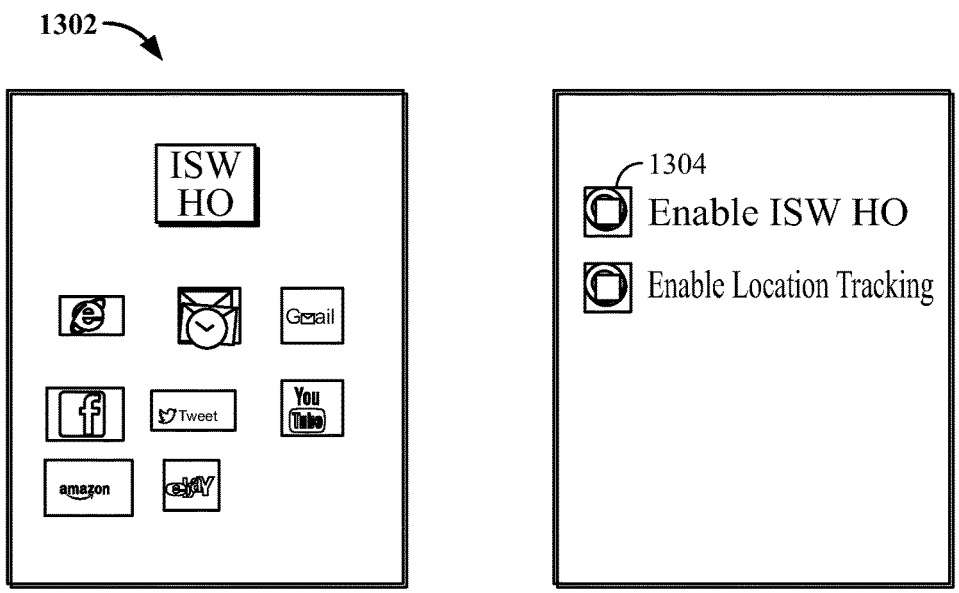
FIG. 13 is a block diagram illustrating a graphical user interface (GUI) for enabling handover in Integrated Small Cell and WiFi Networks (ISWN) in accordance with an example embodiment.

FIG. 13 depicts an example device user interface 1302 comprising icons, buttons, or shortcuts. As shown, a device such as a UE 116, 124 may have an icon stored thereon that may be selected to access user interface features for selecting whether the particular device is to participate in automatic handovers. In an example embodiment, a selectable button 1304 may be activated by the user to indicate a particular device such as, for example, a UE, is to be enabled for purposes of performing handovers within an integrated small-cell and WiFi (ISW) network. If button 1304 is not selected, handover is not enabled.

It will be appreciated that the information entered into a user interface such as depicted in FIGS. 12 and 13 will be stored on the relevant devices and systems. During processing of handovers as described in connection with FIGS. 10 and 11, if the information on a device indicates the particular device is configured to participate, it will operate accordingly. If the information on the device indicates the particular device is not configured to participate, it will not participate in the handover operation.

Example Computing Environment

Figure 14:
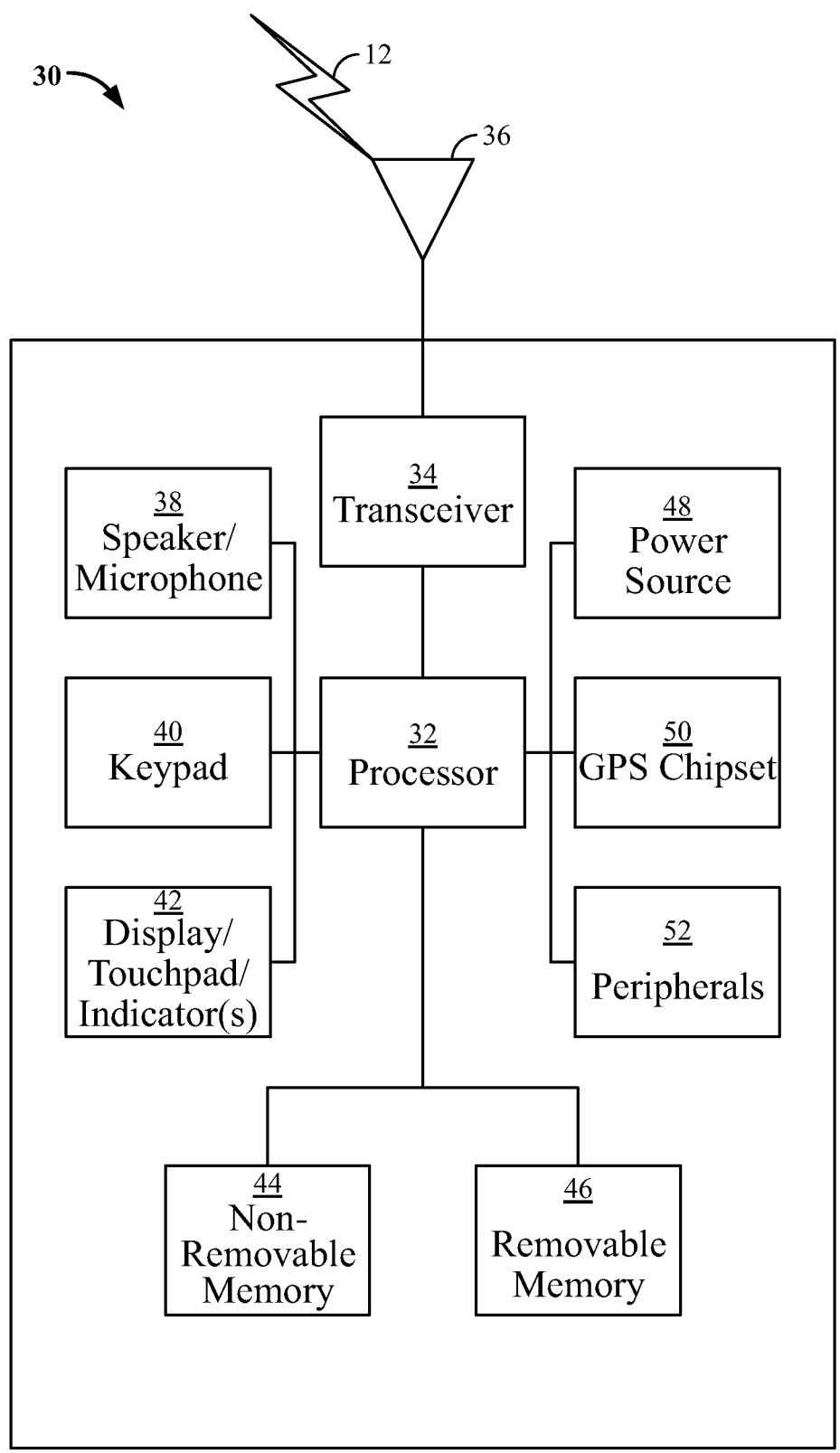
FIG. 14 is a system diagram of an example user equipment that may be used within the communications systems illustrated in FIG. 1 and/or FIG. 7.

FIG. 14 is a diagram of an exemplary device 30 such as a UE or another end node device. The device 30 can be used to implement any of the elements disclosed in this specification including user equipment 124, 116, 530 and 630, (H)eNB 510, 610, and 710, WLAN 512, 612, including any WLAN APs and IAPs 712 comprised in a WLAN, as well any of the logical entities that use these and other elements of this disclosure. For example, the device 30 can be used within the communications systems illustrated in FIG. 1 and/or FIG. 7. The device 30 can also produce user interfaces such as the interfaces shown in FIGS. 12 and 13.

As shown in FIG. 14 the device 30 may include a processor 32, a transceiver 34, a transmit/receive element 36, a speaker/microphone 38, a keypad 40, a display/touchpad/indicator(s) 42, non-removable memory 44, removable memory 46, a power source 48, a global positioning system (GPS) chipset 50, and other peripherals 52. In an example embodiment, display/touchpad/indicator(s) 42 may comprise one or more indicates that operate as part of a user interface. It will be appreciated that the device 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/receive element 36. While FIG. 14 depicts the processor 32 and the transceiver 34 as separate components, it will be appreciated that the processor 32 and the transceiver 34 may be integrated together in an electronic package or chip. The processor 32 may perform application-layer programs, e.g., browsers, and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, another peer. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 14 as a single element, the device 30 may include any number of transmit/receive elements 36. More specifically, the device 30 may employ multiple-input multiple-output (MIMO) technology. Thus, in an embodiment, the device 30 may include two or more transmit/receive elements 36, e.g., multiple antennas, for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling the device 30 to communicate via multiple RATs, such as UTRA and IEEE 802.11 or 802.15, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 32 may receive power from the power source 48, and may be configured to distribute and/or control the power to the other components in the device 30. The power source 48 may be any suitable device for powering the device 30. For example, the power source 48 may include one or more dry cell batteries, e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information, e.g., longitude and latitude, regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15:
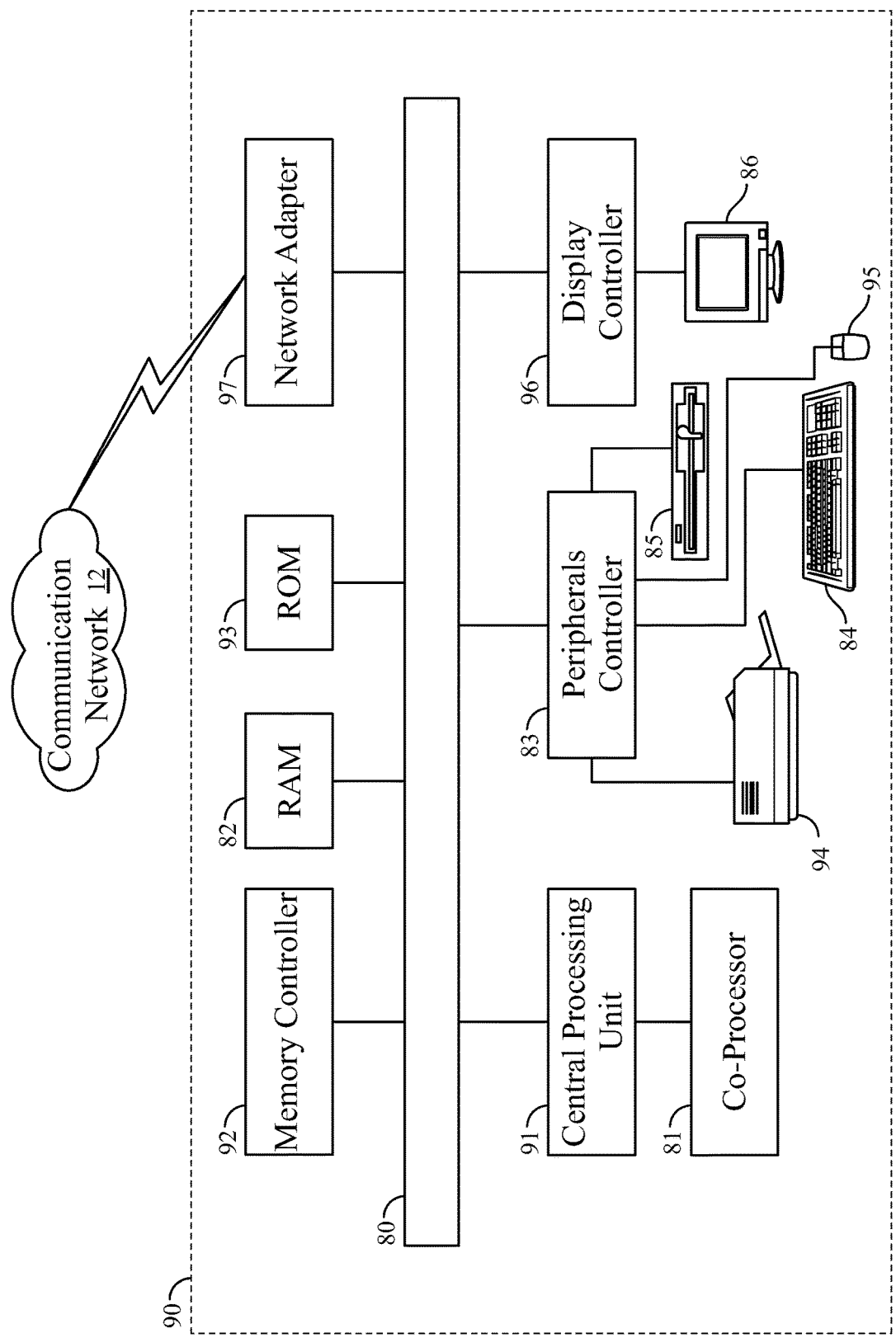
FIG. 15 is a block diagram of an example computing system that may be used within the communications systems illustrated in FIG. 1 and/or FIG. 7.

FIG. 15 is a block diagram of a computer system or server. The device 90 can be used to implement any of the logical entities and elements disclosed in this specification including user equipment 124, 116, 530, and 630, (H)eNB 510, 610, and 710, WLAN 512, 612, including any WLAN APs and IAPs 712 comprised in a WLAN, nodes in the EPC 104, as well any of the logical entities that use these and other elements of this disclosure and other elements as well as the logical entities that use these and other elements of this disclosure. For example, the device 90 can be used within the communications systems illustrated in FIG. 1 and/or FIG. 7. The device 90 can also produce user interfaces such as the interfaces shown in FIGS. 12 and 13.

The computer system or server of FIG. 15 may be controlled primarily by computer readable instructions, which may be in the form of software, wherever, or by whatever means such software is stored or accessed. Such computer readable instructions may be executed within a processor, such as central processing unit (CPU) 91, to cause device 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data in connection with P2P communications.

In operation, CPU 91 fetches, decodes, and executes instructions, and transfers information to and from other resources via the computer's main data-transfer path, system bus 80. Such a system bus connects the components in device 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, device 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by device 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. Further, device 90 may contain network adaptor 97 that may be used to connect device 90 to an external communications network.

Further, computing system 90 may contain network adaptor 97 that may be used to connect computing system 90 to an external communications network, as, for example, a packet data network. In an embodiment, network adaptor 97 may receive and transmit data related to the disclosed inter-system mobility systems and methods.

Accordingly, applicants have disclosed systems and methods for inter-system handovers between integrated long term evolution (LTE) wireless access networks and trusted wireless local area network (WLAN) access networks (TWAN). A communication interface, referred to as the X2' interface, is defined between the LTE wireless access network and the TWAN. The X2' interface is adapted to communicate both control plane signaling and user plane data between the LTE access network and the TWAN. An existing communication connection between a user equipment (UE) and the EPC may be handed over from one of the LTE access network and the TWAN to the other by way of communications over the X2' interface between the two networks.

It will appreciated that the disclosed methods and systems are exemplary, and the disclosed concepts may be implemented in connection with various different technologies and architectures. For example, while in an example embodiment disclosed herein, the TWAN is anchored at the PGW for accessing the EPC, the systems and methods disclosed herein are similarly applicable to architectures where the TWAN is anchored at a different network entity.

The disclosed systems and methods may result in various benefits. For example, communication performance is improved by enabling execution of inter-system mobility procedures close to the edge of the network. Communication latency is reduced by minimizing the need for signaling procedures deep in the core network, i.e., toward the PGW. This can be especially beneficial when an MNO deploys both small cell and WiFi access in a common geographic area. Scalability is also improved by reducing the PGW processing burden, e.g., by distributing some inter-system mobility functions to the (H)eNB and WLAN.

It will be appreciated that while illustrative embodiments have been disclosed, the scope of potential embodiments is not limited to those explicitly set out. For example, while the system has been described with primary reference to "Trusted" WLAN Access Networks (TWAN), the envisioned embodiments extend as well to embodiments that employ "Untrusted" WLANs. Moreover, it will be appreciated that the disclosed embodiments may encompass single-PDN TWANs as well as multi-PDN TWANs.

It will be appreciated that various terms and phrases relevant to wireless communications have been used in this disclosure. For example, the disclosure refers to "small cells," "WiFi hotspots," "Integrated Small Cell and WiFi networks," and "TWAN." These and other such terms should be understood to have their ordinary meanings to those skilled in the art consistent with the descriptions provided herein.

For example, "small cells" are low-powered 3GPP specified radio access nodes, e.g., Home eNode Bs ((H)eNBs), that operate in geographic areas with a range of 10 meters to 1 or 2 kilometers compared to a mobile macrocell, which might have a range of a few tens of kilometers. Small cells may be used to provide in-building and outdoor mobile network access via 3GPP-defined RATs using operator-licensed spectrum. Although 2G and 3G versions of these RATs support circuit-switched as well as packet-switched services, the focus herein is on packet services only, particularly on 4G LTE RATs providing access to the Evolved Packet Core (EPC) network.

Further, "WiFi hotspots," which may be referred as "WiFi" herein, provide wireless network access in a geographic area using unlicensed spectrum via RATs standardized by IEEE 802.11 with equipment certified by the WiFi Alliance (WFA). As noted above, WiFi access to the EPC network in addition to direct access to a local area network or the Internet may be provided.

By way of further example, "Integrated Small Cell and WiFi Network" (ISWN) refers to a joint access network deployed by mobile operators including potential enhancements to multi-RAT terminal capabilities, small cell and WiFi access capabilities, Evolved Packet Core (EPC), network gateways, and policy and traffic management functions.

Still further, the term "trusted WLAN (TWAN) access" refers to the circumstances wherein appropriate measures have been taken to safeguard the EPC from access via the WLAN. Such measures are typically left to the discretion of the MNO and may, for example, include establishment of a tamper-proof fiber connection between the WLAN and EPC, or establishment of an IPSec security association between the WLAN and a Security Gateway at the EPC edge. In contrast, if the WLAN access is deemed "untrusted," the WLAN may interface with an evolved Packet Data Gateway (ePDG) at the EPC edge, and the ePDG must establish an IPSec security association directly with each UE accessing the EPC through the WLAN.

It is understood that any or all of the systems, methods and processes described herein, including the logical entities of FIGS. 1, 7, 9, 10, and 11 may be embodied in the form of computer executable instructions, e.g., program code, stored on a computer-readable storage medium which instructions, when executed by a machine, such as a computer, server, peer, processor, or the like (for example, the device 30 of FIG. 14 or device 90 of FIG. 15), perform and/or implement the systems, methods and processes described herein. Specifically, any of the steps, operations or functions described herein may be implemented in the form of such computer executable instructions. Computer readable storage media include volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The following is a list of acronyms relating to service level technologies that may appear in the above description.

AAA Authentication, Authorization, and Accounting
ACK ACKnowledgment
AP Access Point (802.x)
BSS Basic Service Set (802.x)
CAPEX Capital Expenditure
CQI Channel Quality Indicator
DL Down Link
EAP Extensible Authentication Protocol
EAPoL EAP over Lan
eNodeB Evolved Node B
eNB Evolved Node B
EPC Evolved Packet Core
E-RAB E-UTRAN Radio Access Bearer
ESS Extended Service Set
E-UTRAN Evolved Universal Terrestrial Radio Access Network GPRS General Packet Radio Service
GTP GPRS Tunneling Protocol
(H)eNB Home eNode B
HFN Hyper Frame Number
HO Hand Over
HPLMN Home Public Land Mobile Network
HSS Home Subscription System
IANA Internet Assigned Number Authority
IAP Interface Accessing Point
IETF Internet Engineering Task Force
IP Internet Protocol
IPSec Internet Protocol Security
ISW Integrated Small-cell and WiFi
ISWN Integrated Small-cell and WiFi Networks
LME Layer Management Entity
LTE Long Term Evolution (3GPP)
MAC Medium Access Control
MCN Mobile Core Network
MLME MAC Layer Management Entity
MIMI Multiple-Input Multiple-Output
MME Mobility Management Entity
MNO Mobile Network Operator
OPEX Operational Expenditure
PCRF Policy and Charging Rules Function
PDCP Packet Data Convergence Protocol
PDN Packet Data Network
PGW PDN Gateway
PHY Physical layer
PLCP Physical Layer Convergence Procedure (802.11)
PLME Physical Layer Management Entity
PMD Physical Medium Dependent (802.11)
PDU Protocol Data Unit
DoE Quality of Experience
QoS Quality of Service
RAT Radio Access Technology
RB Radio Bearer
RFC Request For Comment
RLLC Radio and Logic Link Control
RNL Radio Network Layer
RRC Radio Resource Control
RSSI Received Signal Strength Indicator
RTS Request To Send (802.11)
SaMOG S2a Mobility Over GTP
SC Small Cell
SCTP Stream Control Transmission Protocol
SGW Serving Gateway
SME Station Management Entity
SS Service Set (802.11)
STA wireless STAtion (802.x)
TCP Transmission Control Protocol
TEID Tunneling Endpoint Identifier
TNL Transport Network Layer
TWAG Trusted WLAN Access Gateway
TWAN Trusted WLAN Access Network
TWAP Trusted WLAN AAA Proxy
UDP User Datagram Protocol
UE User Equipment
UL Up Link
WFA WiFi Alliance
WiFi Wireless Fidelity
WLAN Wireless Local Area Network
WLC Wireless LAN Controller
WLCP WLAN Control Protocol
WRRC WLAN Radio Resource Control
X2-C X2-Control plane
X2-U X2-User plane
3GPP $3^{rd}$ Generation Partnership Project Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A cellular network access node, comprising:
   one or more computing processors; and
   computing memory communicatively coupled with the one or more computing processors, the computing memory having stored therein executable computing instructions that upon execution cause the cellular network access node to perform operations comprising:
   transmitting, to a wireless local area network (WLAN) access node using an extended X2 interface, a first request to setup communication between the cellular network access node and the WLAN access node;
   receiving, from the WLAN access node a response to the first request to setup the communication;
   using the setup communication, transmit to the WLAN access node using the extended X2 interface, a second request for information regarding a load associated with the WLAN access node;
   using the setup communication, receive from the WLAN access node using the extended X2 interface the information regarding the load associated with the WLAN access node;
   transmitting a third request with management information to the WLAN access node, wherein the management information comprises information associated with the management of one or more bearers;
   receiving an acknowledgement message associated with the third request from the WLAN access node;
   based on the acknowledgement associated with the third request, transmitting a radio resource control reconfiguration message to a UE, wherein the radio resource control reconfiguration message comprises new WLAN configuration information, a WLAN access point (AP) ID, and information to configure the UE's security on WLAN AP connection; and
   communicating downlink data from the cellular network access node using the extended X2 interface to the WLAN access node, wherein the extended X2 interface is an interface for direct signaling and data exchange between the WLAN access node and the cellular network access node.

2. The cellular network access node of claim 1, wherein the third request comprises security context and radio bearer context associated with a user equipment, and information associated with a target WLAN associated with the WLAN access node.

3. The cellular network access node of claim 1, wherein the management information comprises, for each of one or more radio bearers, an uplink packet data convergence protocol (PDCP) sequence number (SN) a downlink PDCP SN, or a hyperframe number.

4. The cellular network access node of claim 1, wherein the extended X2 interface comprises a control plane portion, the control plane portion comprising a stream control transmission protocol (SCTP) or an internet protocol (IP) layer.

5. The cellular network access node of claim 1, wherein the extended X2 interface comprises an application protocol portion within a radio network layer (RNL) and wherein communicating the downlink data using the extended X2 interface comprises communicating the downlink data via the radio network layer.

6. The cellular network access node of claim 1, wherein communicating the downlink data using the extended X2 interface comprises: communicating the downlink data via a user datagram protocol; and communicating the downlink data via a general packet radio service tunneling protocol.

7. The cellular network access node of claim 1, wherein the cellular network access node and the WLAN access node are configured to communicate using different radio access technologies (RATs).

8. A WLAN access node, comprising: one or more computing processors;
computing memory communicatively coupled with the one or more computing processors, the computing memory having stored therein executable computing instructions that upon execution cause the WLAN access node to perform operations, comprising:
receiving from a cellular network access node using an extended X2 interface a first request to setup communication between the cellular network access node and the WLAN access node;
transmitting to the cellular network access node a response to the first request to setup the communication;
receiving from the cellular network access node using the extended X2 interface a second request for information regarding a load associated with the WLAN access node;
based on the second request, transmitting to the cellular network access node using the extended X2 interface the information regarding the load associated with the WLAN access node;
receiving a third request with management information from the cellular network access node, wherein the management information comprises information associated with management of one or more bearers;
in response to receiving the third request configuring resources of the wireless local area network, transmitting an acknowledgement of the third request to the cellular network access node; and
receiving downlink data from the cellular network access node using the extended X2 interface, wherein the downlink data comprises a WLAN access point (AP) ID, and information to configure the UE's security on WLAN AP connection, wherein the extended X2 interface is an interface for direct signaling and data exchange between the WLAN access node and the cellular network access node.

9. The WLAN access node of claim 8, wherein the third request comprises security context and radio bearer context associated with a user equipment, and information associated with a target WLAN associated with the WLAN access node.

10. The WLAN access node of claim 8, wherein the management information comprises, for each of one or more radio bearers, an uplink packet data convergence protocol (PDCP) sequence number (SN) a downlink PDCP SN, or a hyperframe number.

11. The WLAN access node of claim 8, wherein the extended X2 interface comprises a control plane portion, the control plane portion comprising a stream control transmission protocol (SCTP) and an internet protocol (IP) layer.

12. The WLAN access node of claim 8, wherein the extended X2 interface comprises an application protocol portion within a radio network layer (RNL); and wherein receiving from the cellular network access node using the extended X2 interface the downlink data comprises receiving the downlink data via the radio network layer.

13. The WLAN access node of claim 8, wherein receiving the downlink data using the extended X2 interface comprises: receiving the downlink data via a user datagram protocol; and receiving the downlink data via a general packet radio service tunneling protocol.

14. The WLAN access node of claim 8, wherein the cellular network access node and the WLAN access node are configured to communicate using different radio access technologies (RATs).

15. A method comprising:
receiving from a cellular network access node using an extended X2 interface a first request to setup communication between the cellular network access node and a wireless local area network (WLAN) access node;
transmitting to the cellular network access node a response to the first request to setup the communication;
receiving from the cellular network access node using the extended X2 interface a second request for information regarding a load associated with the WLAN access node;
based on the second request, transmitting to the cellular network access node using the extended X2 interface the information regarding the load associated with the WLAN access node;
receiving a third request with management information from the cellular network access node, wherein the management information comprises information associated with management of one or more bearers;
in response to receiving the third request to perform a handover, configuring resources of the wireless local area network;
transmitting an acknowledgement of the third request to the cellular network access node; and
receiving downlink data from the cellular network access node using the extended X2 interface, wherein the downlink data comprises a WLAN access point (AP) ID, and information to configure the UE's security on WLAN AP connection, wherein the extended X2 interface is an interface for direct signaling and data exchange between the WLAN access node and the cellular network access node.

16. The method of claim 15, wherein the third request comprises security context and radio bearer context associated with a user equipment, and information associated with a target WLAN associated with the WLAN access node.

17. The method of claim 15, wherein the management information comprises, for each of one or more radio bearers, an uplink packet data convergence protocol, PDCP, sequence number, SN, a downlink PDCP SN, and a hyperframe number.

18. The method of claim 15, wherein the extended X2 interface comprises a control plane portion, the control plane portion comprising a stream control transmission protocol (SCTP) and an internet protocol (IP) layer.

19. The method of claim 15, wherein the extended X2 interface comprises an application protocol portion within a radio network layer (RNL); and wherein receiving from the cellular network access node using the extended X2 interface the downlink data comprises receiving the downlink data via the radio network layer.

20. The method of claim 15, wherein receiving the downlink data using the extended X2 interface comprises: receiving the downlink data via a user datagram protocol; and receiving the downlink data via a general packet radio service tunneling protocol.

* * * * *